United States Patent
Li

(10) Patent No.: US 12,457,514 B2
(45) Date of Patent: Oct. 28, 2025

(54) SIGNAL MEASUREMENT METHOD AND COMMUNICATION DEVICE AND STORAGE MEDIUM

(71) Applicant: Beijing Xiaomi Mobile Software Co., Ltd., Beijing (CN)

(72) Inventor: Yanhua Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 385 days.

(21) Appl. No.: 17/802,743

(22) PCT Filed: Feb. 27, 2020

(86) PCT No.: PCT/CN2020/077038
§ 371 (c)(1),
(2) Date: Aug. 26, 2022

(87) PCT Pub. No.: WO2021/168757
PCT Pub. Date: Sep. 2, 2021

(65) Prior Publication Data
US 2023/0137463 A1    May 4, 2023

(51) Int. Cl.
*H04W 24/10*  (2009.01)
*H04B 7/06*   (2006.01)

(52) U.S. Cl.
CPC .......... *H04W 24/10* (2013.01); *H04B 7/0626* (2013.01)

(58) Field of Classification Search
CPC .............................. H04W 24/10; H04W 24/08
See application file for complete search history.

(56) References Cited

U.S. PATENT DOCUMENTS

| 2002/0006805 | A1* | 1/2002 | New ..................... H04W 48/16 455/524 |
| 2014/0269534 | A1  | 9/2014 | Persson |
| 2015/0065120 | A1* | 3/2015 | Kim .................... H04W 52/383 455/422.1 |
| 2015/0245299 | A1* | 8/2015 | Lee ................... H04W 52/0261 370/311 |

(Continued)

FOREIGN PATENT DOCUMENTS

| CN | 104053170 A | 9/2014 |
| CN | 106488426 A | 3/2017 |

(Continued)

OTHER PUBLICATIONS

CMCC; RRM measurement relaxation for UE power saving; 3GPP TSG-RAN WG4 Meeting #94-e R4-2000642; Feb. 14, 2020 (Year: 2020).*

(Continued)

*Primary Examiner* — Romani Ohri
(74) *Attorney, Agent, or Firm* — Volpe Koenig

(57) ABSTRACT

A signal measurement method, the method includes: determining a device state of a first user device; entering, in response to that the device state of the first user device satisfies a measurement relaxation condition, a measurement relaxation mode, and in the measurement relaxation mode, determining a first radio measurement result of the first user device in a first type of network according to at least an obtained second radio measurement result of a second user device in the first type of network.

15 Claims, 7 Drawing Sheets

(56) References Cited

U.S. PATENT DOCUMENTS

| | | |
|---|---|---|
| 2015/0366035 A1 | 12/2015 | Baek et al. |
| 2016/0285570 A1 | 9/2016 | Cheng |
| 2017/0215117 A1 | 7/2017 | Kwon et al. |
| 2018/0352415 A1* | 12/2018 | Ma .................. H04B 17/318 |
| 2021/0112503 A1* | 4/2021 | Zhang ................ H04W 24/08 |
| 2022/0264478 A1* | 8/2022 | Miao ................. H04W 52/242 |

FOREIGN PATENT DOCUMENTS

| | | |
|---|---|---|
| CN | 111095982 A | 5/2020 |
| CN | 111919469 A | 11/2020 |
| WO | 2017/113264 A1 | 7/2017 |
| WO | 2018/098708 A1 | 6/2018 |
| WO | 2021/168757 A1 | 9/2021 |

OTHER PUBLICATIONS

Ye, G., "Comparative Study of Cellular Internet of Things Technology NB-IoT and eMTC," Paper, Guangdong Southern Telecom Planning Consulting and Design Institute, China (2019).
CMCC; RRM measurement relaxation for UE power saving; 3GPP TSG-RAN WG4 Meeting #94-e R4-2000642; Feb. 14, 2020.
Chinese Office Action issued on Apr. 28, 2023 for Chinese Patent Application No. 202080000383.6.

* cited by examiner

SIGNAL MEASUREMENT METHOD AND COMMUNICATION DEVICE AND STORAGE MEDIUM

CROSS REFERENCE TO RELATED APPLICATION

The present application is a U.S. National Stage of International Application No. PCT/CN2020/077038, filed on Feb. 27, 2020, the contents of all of which are incorporated herein by reference in their entireties for all purposes.

BACKGROUND

In the $5^{th}$ generation (5G) cellular mobile communication in R17, the research on new radio light (NR-Light) is carried out, with the novel light terminal developed.

The light terminal is aimed at the scenarios in which the required rate, time delay, reliability, etc. are out of reach of the enhanced mobile broadband (eMBB), the ultra reliable low latency communications (URLLCs), and the massive machine-type communications (mMTCs) in R15/R16, for example, the rate is required to be lower than eMBB but higher than mMTC, and the time delay and reliability are required to be lower than URLLC. Typically, the light terminal is applicable to the factory sensor, the video monitor, and the wearable device.

The light terminal features:
1. fewer receivers (RXs) reduced from 4 in R15 to 2 or 1;
2. narrower bandwidth, with the typical bandwidth of frequency range 1 (FR1) being 5 MHz or 10 MHz and the typical bandwidth of FR2 being 40 MHz;
3. reduced processing capacity enabling support for a smaller transport block (TB) and smaller downlink control information (DCI); and
4. limited mobility.

SUMMARY

According to a first aspect of an embodiment of the present disclosure, a signal measurement method is provided, including: determining a device state of a first user device; and entering, in response to that the device state of the first user device satisfies a measurement relaxation condition, a measurement relaxation mode, and in the measurement relaxation mode, determining a first radio measurement result of the first user device in a first type of network according to at least an obtained second radio measurement result of a second user device in the first type of network.

According to a second aspect of an embodiment of the present disclosure, a signal measurement method is provided, and applied to a second user device, including transmitting, in response to that a device state of a first user device satisfies a measurement relaxation condition, a second radio measurement result of the second user device in a first type of network to the first user device. The transmitted second radio measurement result being used by the first user device in a measurement relaxation mode, to determine a first radio measurement result of the first user device in the first type of network.

It is to be understood that both the above general description and the following detailed description are merely illustrative and explanatory and may not limit the examples of the disclosure.

BRIEF DESCRIPTION OF THE FIGURES

The accompanying drawings herein, which are incorporated into and constitute a part of the description, illustrate examples consistent with the disclosure, and used to explain principles of examples of the disclosure, together with the description.

DETAILED DESCRIPTION

The examples will be described in detail herein and shown in the accompanying drawings exemplarily. When the following descriptions relate to the accompanying drawings, unless otherwise indicated, the same numerals in different accompanying drawings denote the same or similar elements. The implementations described in the following examples do not denote all implementations consistent with the examples of the disclosure. On the contrary, they are merely examples of an apparatus and a method consistent with some aspects in the examples of the disclosure, as recited in the appended claims.

The terms used in the examples of the disclosure are merely to describe the specific examples, instead of limiting the examples of the disclosure. The singular forms such as "a", "the", and "this" used in the examples of the disclosure and the appended claims are also intended to include the plural forms, unless otherwise clearly stated in the context. It is also to be understood that the term "and/or" used herein refers to and encompasses any of one or more of associated items listed or all possible combinations.

It is to be understood that although that the terms first, second, third, etc. may be employed in the examples of the disclosure, to describe various information, the information should not be limited thereto. These terms are merely used for distinguishing between the same type of information from each other. For example, first information may also be referred to as second information, and similarly, second information may also be referred to as first information, without departing from the scope of the examples of the disclosure. Depending on the context, the word "if" as used herein may be interpreted as "at the time of" or "when", or "in response to determining".

The disclosure relates to, but is not limited to, the technical field of radio communication, and in particular to a signal measurement method and a communication device, and a storage medium.

Figure 1:
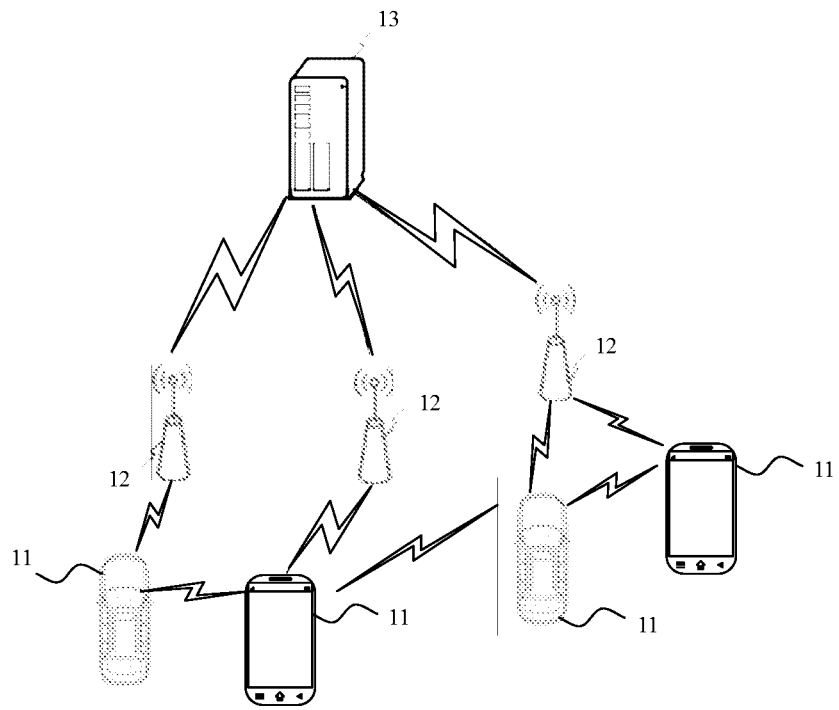
FIG. 1 is a structural schematic diagram of a radio communication system shown according to an example.

FIG. 1 shows a structural schematic diagram of a radio communication system provided in an example of the disclosure. As shown in FIG. 1, the radio communication system is based on a cellular mobile communication, and may include: several terminals 11 and several base stations 12.

The terminals 11 may be devices providing voice and/or data connectivity for a user. The terminals 11 may communicate with one or more core networks via a radio access network (RAN). The terminals 11 may be Internet of Things terminals, such as sensor devices, mobile phones (or referred to as "cellular" phones), and computers with Internet of Things terminals, for example, stationary, portable, pocket, handheld, intra-computer, or vehicle-mounted apparatuses. For example, the terminals 11 may be a station (STA), a subscriber unit, a subscriber station, a mobile station, a mobile, a remote station, an access point, a remote terminal, an access terminal, a user terminal, a user agent, a user device, or a user device (UE). Alternatively, the terminals 11 may be unmanned aerial vehicles. Alternatively, the terminals 11 may also be vehicle-mounted devices, for example, electronic control units having a radio communication function, or radio communication devices externally connected to the electronic control units. Alternatively, the terminals 11 may also be roadside devices, for example, street lamps, signal lamps, etc. having a radio communication function.

The base stations 12 may be network-side devices in the radio communication system. The radio communication system may be a 4th generation mobile communication (4G) system, which is also called a long term evolution (LTE) system. Alternatively, the radio communication system may also be a 5th generation mobile communication (5G) system, which is also called a new radio (NR) system or a 5G NR system. Alternatively, the radio communication system may also be a next generation system following the 5G system. An access network of the 5G system may be called a new generation-radio access network (NG-RAN), or a massive machine-type communication (MTC) system.

Each of the base stations 12 may be an evolved node B (eNB) employed in the 4G system. Alternatively, each of the base stations 12 may be a next generation node B (gNB) employing a centralized-distributed architecture in the 5G system. When employing the centralized-distributed architecture, each of the base stations 12 generally includes a central unit (CU) and at least two distributed units (DUs). The central unit is provided with a protocol stack of a packet data convergence protocol (PDCP) layer, a radio link control (RLC) layer, and a media access control (MAC) layer. Each of the distributed units is provided with a protocol stack of a physical (PHY) layer. Specific implementations of the base stations 12 are not limited in the examples of the disclosure.

The base stations 12 are in wireless radio connection with the terminals 11. In different implementations, the wireless radio is based on a standard of the 4th generation mobile communication (4G), or a standard of the 5th generation mobile communication (5G), and is a new radio, for example. Alternatively, the wireless radio may also be based on a standard of a next generation mobile communication following 5G.

In some examples, an end to end (E2E) connection may be established between the terminals 11. For example, scenarios such as vehicle to vehicle (V2V) communication, vehicle to infrastructure (V2I) communication, and vehicle to pedestrian (V2P) communication in vehicle to everything (V2X) communication are provided.

In some examples, the radio communication system may further include a network management device 13.

Several base stations 12 are connected with the network management device 13. The network management device 13 may be a core network device in the radio communication system. For example, the network management device 13 may be a mobility management entity (MME) in an evolved packet core (EPC). Alternatively, the network management device may also be another core network device, such as a serving gateway (SGW), a public data network gateway (PGW), a policy and charging rules function (PCRF), or a home subscriber server (HSS). An implementation form of the network management device 13 is not limited in the examples of the disclosure.

Execution entities involved in the examples of the disclosure include, but are not limited to, user device such as industrial sensors, monitoring cameras, wearable devices, and mobile terminals, the base stations, etc. which employ cellular 5G for communication.

An application scenario of the examples of disclosure is that a light terminal may be one other than those defined in a communication protocol in the R15/R16. The light terminal may have a rate required to be lower than an enhanced mobile broadband (eMBB), but higher than massive machine-type communication (mMTC), and a time delay and reliability required to be lower than ultra reliable low latency communication (URLLC). Generally, the light terminal is required to reduce processing complexity and unnecessary processes, so as to save on power. For the wearable devices, such as light terminals including a smart watch, since both the smart watch and the mobile phone which are generally carried by the user at the same time are moved simultaneously, a relatively fixed position relation is formed between the light terminal and the handheld mobile terminal of the user. In a related technology, the smart watch and the mobile terminal are independent of each other, to measure network radio signals.

Figure 2:
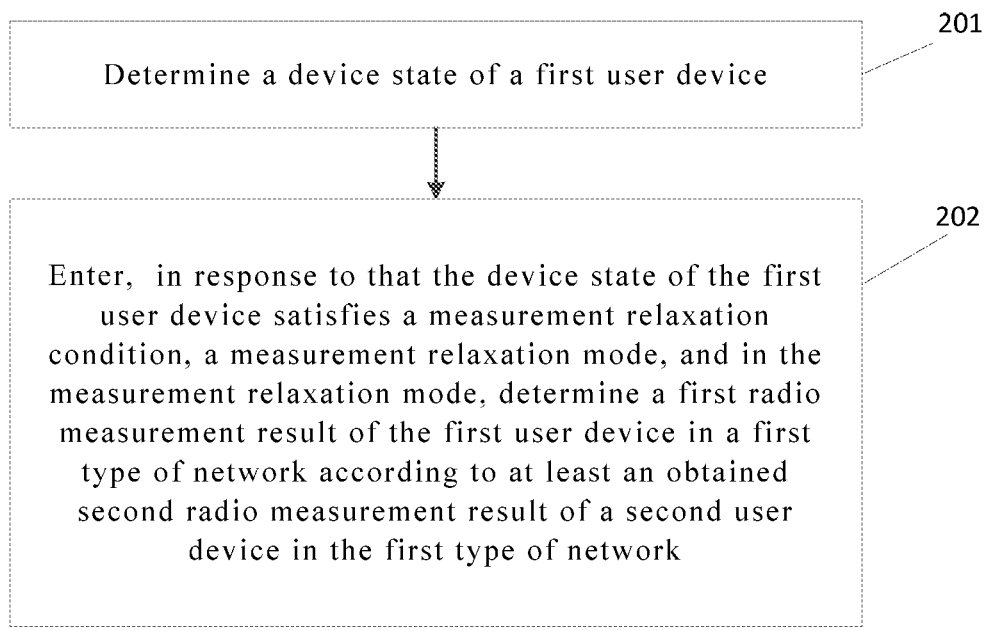
FIG. 2 is a schematic flow chart of a signal measurement method shown according to an example.

As shown in FIG. 2, the present example provides a signal measurement method, which may be applied to a first user device or a base station for radio communication. The signal measurement, may be performed by the first user device or the base station, and the method may include steps 201 and 202.

Step 201 includes determining a device state of a first user device.

Step 202 includes entering, in response to that the device state of the first user device satisfies a measurement relaxation condition, a measurement relaxation mode, and in the measurement relaxation mode, determining a first radio measurement result of the first user device in a first type of network according to at least an obtained second radio measurement result of a second user device in the first type of network.

Herein, the first user device may be a communication device having a smaller battery capacity or less remaining power. The second user device may be a communication device having a larger battery capacity or more remaining power.

For example, the first user device may be a wearable device such as a smart watch, a sports bracelet or the like, or a mobile phone or the like having less remaining power. The second user device may be a mobile phone or the like having more power.

For example, the first user device may have a lower frequency of use by a user or a smaller application range, while the second user device has a higher frequency of use by a user than the first user device or a wider application range than the first user device. For example, the first user device may be a wearable device; and the second user device is a mobile phone. The user is more likely to use the mobile phone to talk, socialize, order items, and check news. The user may use the wearable device for monitoring sleep, etc.

The first user device and the second user device may be capable of accessing the first type of network. For example, the first type of network may be a 4G or 5G cellular mobile communication network, which may be accessed by the smart watch and the mobile phone.

Radio measurement results may be an uplink radio measurement result of an uplink signal and/or a downlink radio measurement result of a downlink signal. The downlink radio measurement result is obtained by measuring, by the user device, a downlink signal of a base station. The uplink radio measurement result is obtained by measuring, by the base station, the uplink signal of the user device. Herein, a radio signal measurement may be a signal quality measurement, etc. on uplink signals or downlink signals of the first type of network. The uplink signals or downlink signals of the first type of network may include uplink signals or downlink signals for different frequency ranges and different cells. The measurement result obtained through the radio signal measurement may be used as a basis for handover between cells, reselecting the cells or the like. The uplink signals may be measured by the base station, and the downlink signals may be measured by the user device.

The first type of network herein may include: the cellular mobile communication network. The cellular mobile communication network may include: a radio communication network between the base station and the user device.

The measurement relaxation mode may be: a measurement mode in which the first user device does not perform a radio measurement in the first type of network in a downlink radio measurement, or a measurement mode in which a radio measurement frequency is reduced relative to a non-measurement relaxation mode in a downlink radio measurement, or a measurement mode in which the base station does not perform an uplink radio measurement on the first user device in an uplink radio measurement, or a measurement mode in which the base station reduces, relative to a non-measurement relaxation mode, a measurement frequency on an uplink measurement signal of the first user device in an uplink radio measurement. The non-measurement relaxation mode is one other than the measurement relaxation mode. The measurement relaxation condition is one for entering the measurement relaxation mode. The measurement relaxation condition may be one in which the first user device and the second user device are positioned at places where close radio measurement results are provided. For example, the measurement relaxation condition may be that a distance interval between the first user device and the second user device is smaller than a distance threshold, or a distance between the first user device and the base station and a distance between the second user device and the base station are smaller than a distance threshold. When the first user device and the second user device are close to each other, the radio measurement results of the first user device in the first type of network and the second user device are close to each other. The first user device or the base station may determine the radio measurement result of the first user device according to the radio measurement result of the second user device in a first type of network.

The step of determining a device state of a first user device may include, but is not limited to, determining a position relation between the first user device and the second user device, or determining a connection condition between the first user device and the second user device through a short-distance communication network therebetween. The distance between the first user device and the second user device may be determined through positioning, etc. A relative distance may also be determined through a signal strength of the short-distance communication network, etc. For example, when the distance between the first user device and the second user device is smaller than a predetermined distance threshold, the radio measurement result of the second user device may be determined as the radio measurement result of the first user device. The first user device may transmit the device state to the base station through the first type of network, and the base station performs an uplink signal measurement according to the device state of the first user device.

When the first user device is in radio connection with the second user device through short-distance communication, it is indicated that the first user device and the second user device are close to each other. In this case, a measurement result of the second user device in a first type of radio network, may be directly used as the radio measurement result of the first user device in the first type of radio network, or assist in determining the radio measurement result of the first user device in the first type of radio network.

When a signal of a connection established between the first user device and the second user device through the short-distance communication is strong enough, it is also indicated that the first user device and the second user device are close to each other. In this case, a measurement result of the second user device in the first type of radio network, may be directly used as a radio measurement result of the first user device in the first type of radio network, or assist in determining the radio measurement result of the first user device in the first type of radio network. Herein, for the downlink signal measurement, the second user device with more power may perform the radio signal measurement, and the first user device does not perform the radio signal measurement or reduces a measurement frequency and narrows a measurement range. For the uplink signal measurement, the base station may measure an uplink measurement signal of the second user device with more power, and the first user device may not transmit the uplink measurement signal or may reduce transmission of the uplink measurement signal. The first user device or the base station may determine, based on the radio measurement result of the second user device, the radio measurement result of the first user device.

In this way, the second user device performs the radio signal measurement, the radio measurement result of the first user device is determined according to the radio measurement result of the second user device, and the first user device does not perform or reduces the radio signal measurement, so that power consumed by the first user device for the radio signal measurement may be reduced, to prolong a standby time of the first user device.

Figure 3:
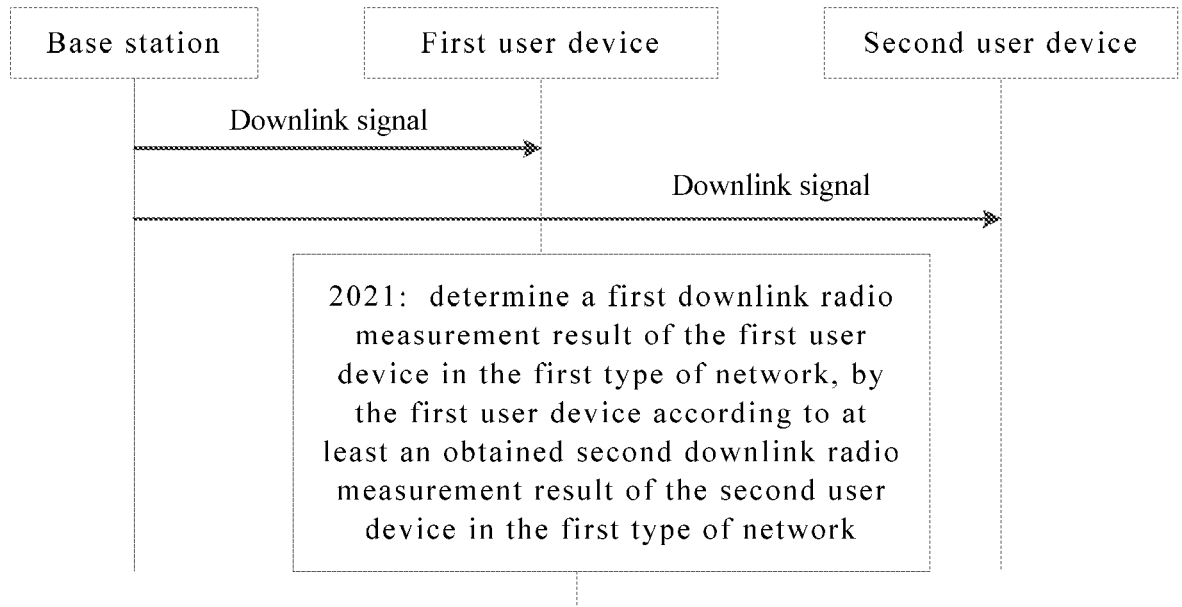
FIG. 3 is a schematic flow chart of another signal measurement method shown according to an example.

In an example, as shown in FIG. 3, step 202 may include step 2021.

Step 2021 includes determining a first downlink radio measurement result of the first user device in the first type of network, by the first user device according to at least an obtained second downlink radio measurement result of the second user device in the first type of network.

The base station of the first type of network, etc. may transmit measurement configuration to instruct the first user device to perform the radio signal measurement on the downlink signal. Since the first user device including the wearable devices such as the smart watch and the bracelet has small battery power, frequent radio signal measurements will consume a battery current and shorten a standby time. After receiving the measurement configuration, the first user device may not perform or may reduce the radio signal measurement, for example, reduce a measurement frequency, narrow a signal range, etc., if the device state of the first user device satisfies the measurement relaxation condition. The first user device may determine the downlink radio measurement result of the first user device according to the downlink radio measurement result obtained by performing, by the second user device, the radio signal measurement in the first type of network. Thus, the first user device may reduce the power consumed by the radio signal measurement.

For example, the first user device is a smart watch, the second user device is a mobile phone, and the first type of network is a 5G cellular mobile communication network. The base station of the 5G cellular mobile communication network transmits measurement configuration to the smart watch, to instruct the smart watch to perform a radio signal measurement on the 5G cellular mobile communication network. The smart watch may not perform a radio signal measurement, and may take a downlink radio measurement result of the mobile phone as a downlink radio measurement result of the smart watch. The smart watch may also combine the downlink radio measurement result of the smart watch with a downlink radio measurement result obtained by performing some radio signal measurements, to obtain a complete downlink radio measurement result, so that the smart watch reduces the radio signal measurement, to save on power consumed by the smart watch.

The smart watch and the mobile phone are close to each other. Accordingly, radio signal measurement results of the smart watch and the mobile phone are close to each other. The measurement result obtained by the mobile phone may be used as a basis for the smart watch to reselect a cell, etc.

In an example, step 2021 of determining a first radio measurement result of the first user device in a first type of network according to at least an obtained second radio measurement result of a second user device in the first type of network includes at least one of the following: determine the obtained second downlink radio measurement result as the first downlink radio measurement result of the first user device in the first type of network; obtain the first downlink radio measurement result of the first user device in the first type of network according to the obtained second downlink radio measurement result and a first measurement offset; and obtain the first downlink radio measurement result of the first user device in the first type of network according to the obtained second downlink radio measurement result and a third downlink radio measurement result of the first user device in the first type of network.

The first user device may directly determine the downlink radio measurement result obtained by performing, by the second user device, the downlink radio signal measurement as the downlink radio measurement result of the first user device in the first type of network. For example, the first user device and the second user device are mobile phones of the same type, and close to each other. In this case, the downlink radio measurement result of one mobile phone may be determined as the downlink radio measurement result of the other mobile phone. In this way, the first user device may not perform the signal measurement, to save on the power consumed by the first user device.

When radio signal transceiving capacities or signal transmission environments of the first user device and the second user device differ from each other, or a distance between the first user device and the second user device is constantly varied, the downlink radio measurement result obtained by performing, by the second user device, the signal measurement is compensated with a measurement offset, or downlink radio measurement results obtained by performing, by a plurality second user devices, signal measurements are averaged and determined as the downlink radio measurement result of the first user device in the first type of network. In this way, the first user device may not perform the signal measurement, to save on the power consumed by the first user device.

The first user device may perform only a part of a complete signal measurement, and the second user device performs the remaining part of the measurement. The third downlink radio measurement result may be a historical downlink radio measurement result, and the first downlink radio measurement result may be a current downlink radio measurement result. For example, the first user device and the second user device perform the signal measurement at intervals, and historical downlink radio measurement results measured by the first user device are combined with the downlink radio measurement result measured by the second user device into the current downlink radio measurement result reported by the first user device to the base station. For example, the historical downlink radio measurement results may be measurement results of some of a plurality of frequency ranges required by the base station, the downlink radio measurement results measured by the second user device may be measurement results of the others of the plurality of frequency ranges required by the base station, and the historical downlink radio measurement results may be combined with the downlink radio measurement results measured by the second user device into downlink radio measurement results of the plurality of frequency ranges, to satisfy a measurement requirements, on the plurality of frequency ranges, of the base station. In this way, a load on the first user device for the signal measurement is reduced, to save on the power consumed by the first user device. The historical downlink radio measurement results may be the radio measurement results measured by the first user device, and only include some of the downlink radio measurement results, for example, a downlink radio measurement result of a certain frequency range. The historical downlink radio measurement results may be combined with the downlink radio measurement result measured by the second user device, to form a complete downlink radio measurement result of the first user device in the first type of network.

In an example, the step of obtaining the first downlink radio measurement result of the first user device in the first type of network according to the obtained second downlink radio measurement result and a first measurement offset includes obtaining the first downlink radio measurement result of the first user device in the first type of network by compensating the obtained second downlink radio measurement result with first measurement offset.

Herein, the first measurement offset may be first measurement offset. The first measurement offset may be a difference in downlink radio measurement result generated by differences in distance between the first user device and the base station and between the second user device and the base station respectively, a difference in signal receiving capacity, a difference in signal processing capability, etc.

After receiving the downlink radio measurement result measured by the second user device, the first user device may perform compensated with the first measurement offset, so that a compensated radio measurement result is more consistent with an actual situation of the first user device.

In this way, accuracy of the downlink radio measurement result of the first user device in the first type of network may be improved.

In an example, the method further includes receiving, by the first user device, the first measurement offset sent by the base station; or, obtaining, by the first user device, the first measurement offset pre-written, pre-negotiated, or specified in a protocol.

The base station may issue the first measurement offset, for example, the first measurement offset may be transmitted to the first user device by the base station through dedicated signaling or common signaling. The first measurement offset may also be written in the first user device in a hardcode manner, or pre-specified in a communication protocol, etc.

In an example, the method further includes determining, by the first user device the first measurement offset based on a gain difference between a radio power amplifier of the first user device and a radio power amplifier of the second user device, where herein, the radio power amplifiers may be those for the downlink signal; a gain of the radio power amplifier may affect sensitivity for obtaining the downlink signal by the user device, and further affect the downlink radio measurement result; the gain difference and the difference in downlink radio measurement result may be measured experimentally; and for example, a difference in downlink radio measurement results between the first user device and the second user device in the same position under a certain gain difference may be measured experimentally. Record the difference in downlink radio measurement result into the first user device. When the downlink radio signal measurement is actually performed, the first user device may compensate the obtained downlink radio measurement result of the second user device with the difference in downlink radio measurement result. In this way, accuracy of the downlink radio measurement result of the first user device may be improved.

In an example, the step of obtaining the first downlink radio measurement result of the first user device in the first type of network according to the obtained second downlink radio measurement result and a first measurement offset includes determining an average of obtained N second downlink radio measurement results, obtained by measuring by the second user device in N measurement periods respectively, as the first downlink radio measurement result, in a time interval occupied by the N measurement periods of the first user device in the first type of network.

A first distance between the first user device and the base station and a second distance between the second user device and the base station may be varied constantly. A magnitude relation between the first distance and the second distance are also varied constantly. Thus, the downlink radio measurement result of the first user device may be an average of downlink radio measurement results of the plurality of second user devices. In this way, the accuracy of the radio measurement result of the first user device may be improved.

In an example, the method further includes receiving, by the first user device, the N sent by the base station; or, obtaining, by the first user device, the N pre-written, pre-negotiated, or specified in a protocol.

The base station may issue N, for example, N may be transmitted to the first user device by the base station through dedicated signaling or common signaling. N may also be written in the first user device in a hardcode manner, or pre-specified in a communication protocol, etc.

In an example, the step of obtaining the first downlink radio measurement result of the first user device in the first type of network according to the obtained second downlink radio measurement result and a third downlink radio measurement result of the first user device in the first type of network includes at least one of the following:

obtain the first downlink radio measurement result according to the obtained second downlink radio measurement result measured by the second user device in a first frequency range and the third downlink radio measurement result measured by the first user device in a second frequency range, wherein the first frequency range is different from the second frequency range;

obtain the first downlink radio measurement result according to the obtained second downlink radio measurement result measured by the second user device in a first time interval and the third downlink radio measurement result measured by the first user device in a second time interval, wherein the first time interval is different from the second time interval; and obtain the first downlink radio measurement result according to the obtained second downlink radio measurement result measured by the second user device in a first cell and the third downlink radio measurement result measured by the first user device in a second cell, wherein the first cell is different from the second cell.

For example, the downlink radio measurement result of the first user device may be combined with the downlink radio measurement result of the second user device in different frequency ranges. For example, the first user device measures some carrier frequencies, and downlink radio measurement results of other carrier frequencies may be measured by the second user device. For example, the first user device may measure an intra-frequency signal, and downlink radio measurement results of inter-frequency signals are obtained from the second user device. In this way, a frequency range of the downlink signal measurement of the first user device is narrowed, to reduce the power consumed by the first user device, so as to save on the power.

For example, the downlink radio measurement result of the first user device may be combined with the downlink radio measurement result of the second user device in different time intervals. For example, the first user device may measure some time intervals, and downlink radio measurement results of other time intervals may be measured by the second user device. For example, an entire time interval contains 200 ms, the user device is required to perform a measurement once every 20 ms during a normal measurement. Herein, the first user device may perform a measurement once every 40 ms, and the downlink radio measurement result of the second user device is used for other sampling points. In this way, a time range of the downlink signal measurement of the first user device is narrowed, to reduce the power consumed by the first user device, so as to save on the power.

For example, in a scenario such as cell handover, the base station requires the user device to perform signal measurements on two or more cells. The first user device and the second user device may perform measurements in different cells. The first user device completes downlink radio signal measurements of some of the cells, and the second user device completes downlink radio signal measurements of the other cells. For example, the first user device measures a present cell, and downlink radio measurement results of other neighboring cells are obtained from the second user device. The first user device may combine the measurement results of the two parts of the cells and report same to the base station. In this way, a cell range of the downlink signal measurement of the first user device is narrowed, to reduce the power consumed by the first user device, so as to save on the power.

Figure 4:
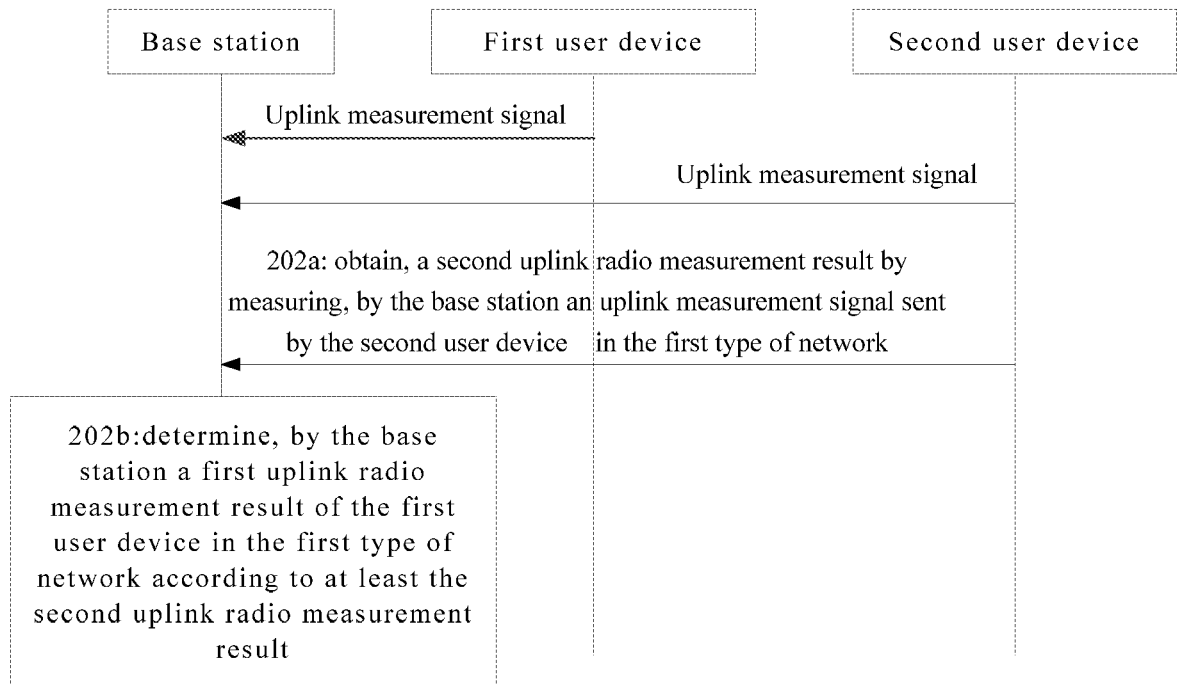
FIG. 4 is a schematic flow chart of still another signal measurement method shown according to an example.

In an example, as shown in FIG. 4, step 202 may include steps 202*a* and 202*b*.

202*a* includes obtaining, a second uplink radio measurement result by measuring, by the base station an uplink measurement signal sent by the second user device in the first type of network; and

202*b* includes determining, by the base station a first uplink radio measurement result of the first user device in the first type of network according to at least the second uplink radio measurement result.

The base station is required to instruct the first user device and/or the second user device to transmit the uplink measurement signal when performing the uplink radio measurement, and performs a quality measurement on a received uplink measurement signal. Transmission of the uplink measurement signal will consume more power of the user device and shorten a standby time.

Herein, the base station may not perform or may reduce the radio signal measurement on the uplink measurement signal of the first user device, for example, reduce a measurement frequency, etc. The first user device may not transmit the uplink measurement signal for the uplink signal measurement, or may reduce a frequency of transmitting the uplink measurement signal or the like.

The base station may perform the radio signal measurement, in the first type of network, on the second user device, to obtain the uplink radio measurement result, and determine the downlink radio measurement result of the first user device according to the uplink radio measurement result of the second user device. For example, the base station may determine the uplink radio measurement result of the second user device as the downlink radio measurement result of the first user device.

For example, the first user device is a smart watch, the second user device is a mobile phone, and the first type of network is a 5G cellular mobile communication network. The base station may not perform the radio signal measurement on the uplink measurement signal of the smart watch, and may take the uplink radio measurement result of the mobile phone as the uplink radio measurement result of the base station. The smart watch does not transmit the uplink measurement signal, to save on power consumed by the smart watch.

In this way, the first user device may reduce power consumed by transmitting the uplink measurement signal, etc.

In an example, the step of determining a first radio measurement result of the first user device in a first type of network according to at least an obtained second radio measurement result of a second user device in the first type of network includes at least one of the following:

determine the second uplink radio measurement result as the first uplink radio measurement result of the first user device in the first type of network;

obtain the first uplink radio measurement result of the first user device in the first type of network according to the second uplink radio measurement result and a second measurement offset; and obtain the first uplink radio measurement result of the first user device in the first type of network according to the second uplink radio measurement result and a third uplink radio measurement result, measured by the base station of the first user device in the first type of network.

The base station may directly determine the uplink radio measurement result of the second user device as the uplink radio measurement result of the first user device in the first type of network. For example, the first user device and the second user device are mobile phones of the same type, and close to each other. In this case, an uplink radio measurement result of one mobile phone may be determined as an uplink radio measurement result of the other mobile phone. In this way, the first user device may not transmit the uplink measurement signal, to save on the power consumed by the first user device.

When radio signal transceiving capacities or signal transmission environments of the first user device and the second user device differ from each other, or a distance between the first user device and the second user device is constantly varied, the uplink radio measurement result obtained by performing, by the base station, the signal measurement on the second user device is compensated with a measurement offset, or uplink radio measurement results of a plurality of second user devices are averaged and determined as the uplink radio measurement result of the first user device in the first type of network. In this way, the first user device may not transmit the uplink measurement signal, to save on the power consumed by the first user device.

For the complete uplink radio measurement, the base station may only perform a part of the uplink radio measurement on the first user device, for example, only measure the uplink measurement signal of the first user device in one time interval. For an uplink radio measurement of a remaining time interval, the base station may perform the uplink measurement signal measurement on the second user device. The third uplink radio measurement result may be a historical uplink radio measurement result, and the first uplink radio measurement result may be a current uplink radio measurement result. For example, the first user device and the second user device perform signal measurement at intervals, and the historical uplink radio measurement result measured by the first user device is combined with the uplink radio measurement result measured by the second user device into the current uplink radio measurement result reported by the first user device to the base station. For example, the historical uplink radio measurement results may be measurement results of some of a plurality of frequency ranges required by the base station, the uplink radio measurement results measured by the second user device may be measurement results of the others of the plurality of frequency ranges required by the base station, and the historical uplink radio measurement results may be combined with the uplink radio measurement results measured by the second user device into uplink radio measurement results of the plurality of frequency ranges, to satisfy a measurement requirement, on the plurality of frequency ranges, of the base station. In this way, the first user device is required to transmit the uplink measurement signal only when necessary, instead of transmitting the radio measurement signal in an entire uplink radio measurement process, so that a load on the first user device is reduced, to save on the power consumed by the first user device. The historical uplink radio measurement results may be radio measurement results, measured by the base station, of the uplink measurement signals of the first user device, and only include some of the uplink radio measurement results, for example, an uplink radio measurement result of a certain frequency range. The historical uplink radio measurement results may be combined with the uplink radio measurement results measured by the second user device, to form a complete uplink radio measurement result of the first user device in the first type of network.

In an example, the step of obtaining the first uplink radio measurement result of the first user device in the first type of network according to the second uplink radio measurement result and a second measurement offset includes obtaining the first uplink radio measurement result of the first user device in the first type of network by compensating the second uplink radio measurement result with second measurement offset.

Herein, the second measurement offset may be the second measurement offset. The second measurement offset may be a difference in radio measurement result generated by differences in distance between the first user device and the base station and between the second user device and the base station respectively, a difference in signal transmission capacity, etc. After the uplink radio measurement result measured by the second user device is obtained, the first user device may perform compensation with the second measurement offset, so that a compensated uplink radio measurement result is more consistent with an actual situation of the first user device.

In this way, accuracy of the uplink radio measurement result of the first user device in the first type of network may be improved.

In an example, the method further includes obtaining, by the base station, the second measurement offset pre-written, pre-negotiated, or specified in a protocol.

The second measurement offset may also be written in the base station in a hardcode manner, or pre-specified in a communication protocol, etc.

In an example, the method further includes determining, by the base station the second measurement offset based on a difference between transmission power of the first user device and transmission power of the second user device.

Herein, the difference between the transmission power of the first user device and the transmission power of the second user device may affect a strength of the uplink measurement signal received by the base station, etc., and further affect the radio measurement result. The difference in transmission power and the difference in uplink radio measurement result may be measured experimentally. For example, the difference in uplink radio measurement result between the first user device and the second user device at the same position under a certain transmission power difference may be measured experimentally. Record the difference in uplink radio measurement result into the base station. When performing the uplink radio signal measurement actually, the base station may compensate the obtained uplink radio measurement result of the second user device with the difference in uplink radio measurement result. In this way, the accuracy of the uplink radio measurement result of the first user device may be improved.

In an example, the step of obtaining the first uplink radio measurement result of the first user device in the first type of network according to the second uplink radio measurement result and a second measurement offset includes: determine an average of M second uplink radio measurement results, obtained by measuring in M measurement periods respectively, as the first uplink radio measurement result of the first user device in the first type of network in a time interval occupied by the M measurement periods.

A first distance between the first user device and the base station and a second distance between the second user device and the base station may be varied constantly. A magnitude relation between the first distance and the second distance are also varied constantly. In this way, the uplink radio measurement result of the first user device may be an average of uplink radio measurement results of the plurality of second user devices. In this way, the accuracy of the uplink radio measurement result of the first user device may be improved.

In an example, the method further includes obtaining, by the base station, the M pre-written, pre-negotiated, or specified in a protocol.

M may also be written in the base station in a hardcode manner, or pre-specified in a communication protocol, etc.

In an example, the step of obtaining the first uplink radio measurement result of the first user device in the first type of network according to the second uplink radio measurement result and a third uplink radio measurement result, measured by the base station of the first user device in the first type of network includes at least one of the following:

obtain the first uplink radio measurement result according to the second uplink radio measurement result measured in a third frequency range and the third uplink radio measurement result measured in a fourth frequency range, wherein the third frequency range is different from the fourth frequency range;

obtain the first uplink radio measurement result according to the second uplink radio measurement result measured in a third time interval and the third uplink radio measurement result measured in a fourth time interval, wherein the third time interval is different from the fourth time interval; and obtain the first uplink radio measurement result according to the second uplink radio measurement result measured in a third cell and the third uplink radio measurement result measured in a fourth cell, wherein the third cell is being different from the fourth cell.

For example, the uplink radio measurement result of the first user device may be combined with the uplink radio measurement result of the second user device in different frequency ranges. For example, the first user device measures some carrier frequencies, and uplink radio measurement results of other carrier frequencies may be measured by the second user device. For example, the first user device may measure an intra-frequency signal, and uplink radio measurement results of inter-frequency signals are obtained from the second user device. In this way, a frequency range of the uplink signal measurement of the first user device is narrowed, to reduce the power consumed by the first user device, so as to save on the power.

For example, the uplink radio measurement result of the first user device may be combined with the uplink radio measurement result of the second user device in different time intervals. For example, the first user device performs a measurement in some time intervals, and uplink radio measurement results of other time intervals may be measured by the second user device. For example, an entire time interval contains 200 ms, the user device is required to perform a measurement once every 20 ms during a normal measurement. Herein, the first user device may perform a measurement once every 40 ms, and the uplink radio measurement result of the second user device is used for other sampling points. In this way, a time range of the uplink signal measurement of the first user device is narrowed, to reduce the power consumed by the first user device, so as to save on the power.

For example, in a scenario such as cell handover, the base station requires the user device to perform signal measurements on two or more cells. The first user device and the second user device may perform measurements in different cells. The first user device completes uplink radio signal measurements of some of the cells, and the second user device completes uplink radio signal measurements of other cells. For example, the first user device measures a present cell, and uplink radio measurement results of other neighboring cells are obtained from the second user device. Measurement results of the two or more cells are obtained by measuring the first user device and the second user device, respectively. In this way, a cell range of the uplink signal measurement of the first user device is narrowed, to reduce the power consumed by the first user device, so as to save on the power.

In an example, the method further includes performing, by the first user device in response to a condition that the device state of the first user device does not satisfy the measurement relaxation condition, a downlink radio measurement in the first type of network.

When positions of the first user device and the second user device have different radio measurement results, it is impossible to determine, based on the downlink radio measurement result of the second user device, the downlink radio measurement result of the first user device. In this case, the first user device may perform the downlink radio measurement, to improve accuracy of the downlink radio measurement result.

In an example, the step of determining a first downlink radio measurement result of the first user device in the first type of network according to at least an obtained second downlink radio measurement result of the second user device in the first type of network includes:

determine a first downlink radio measurement result of the first user device, for a channel state indication (CSI) signal according to at least an obtained second downlink radio measurement result for the CSI signal of the first type of network.

For the downlink radio measurement, a signal quality of the CSI signal may be measured. The downlink radio measurement result may include a measurement result of reference signal receiving power (RSRP) and/or a measurement result of a reference signal receiving quality (RSRQ) of the CSI signal.

In an example, the first downlink radio measurement result of the first user device in the first type of network includes a first downlink radio measurement result of the first user device in a predetermined cell of the first type of network and/or a first downlink radio measurement result of the first user device in a predetermined beam of the first type of network.

The downlink radio measurement may be in a cell level or a beam level measurement result. In this way, selection flexibility of the downlink radio measurement may be improved.

In an example, the obtained second downlink radio measurement result of the second user device in a first type of network includes the second downlink radio measurement result of the second user device in the first type of network obtained through a second type of network.

The first type of network and the second type of network may have different communication protocols, communication frequency ranges, and/or power ranges. The first type of network may be a radio communication network having a larger coverage area and larger transmission power of the radio signal. The second type of network may be a radio communication network having a smaller coverage area and smaller transmission power of the radio signal.

For example, the first type of network may be a 4G or 5G cellular mobile communication network. The first type of network may be a short-distance communication network such as Bluetooth (BT), low-power consumption Bluetooth, Wi-Fi or the like.

Figure 5:
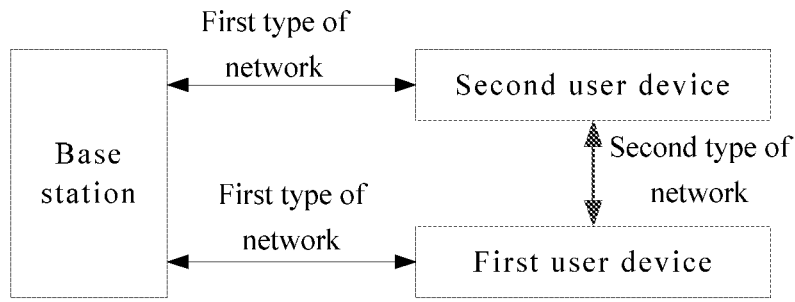
FIG. 5 is a schematic diagram of a network architecture shown according to an example.

As shown in FIG. 5, both the first user device and the second user device may access the first type of network. Both the first user device and the second user device may also access the second type of network, and the first user device is connected with the second user device through the second type of network. For example, the smart watch and the mobile phone may access the 4G or 5G cellular mobile communication network, and are connected with each other through the low-power consumption Bluetooth.

The first user device may receive the downlink radio measurement result, measured by the second user device, of the second user device through the second network.

In an example, the second user device is being a device bundled to the first user device through the second type of network.

The first user device is connected with the second user device through the second type of network, it may be determined that the first user device and the second user device are close to each other, and have the similar radio measurement results obtained through the radio signal measurement, so that the first user device may determine the downlink radio measurement of the first user device according to the downlink radio measurement result obtained by performing, by the second user device, the downlink radio measurement in the first type of network. The base station may determine, based on the measured uplink radio measurement result of the second user device, the uplink radio measurement result of the first user device.

In an example, the measurement relaxation condition includes at least one of the following:

the first user device being a device bundled to the second user device through a second type of network;

a signal strength of the second type of network measured by the first user device is greater than a first signal strength threshold;

a distance between the first user device and the second user device is smaller than a first distance threshold;

a signal strength of the first type of network measured by the first user device is greater than a second signal strength threshold; and a variation value of a signal strength, measured by the first user device within a predetermined time interval, of the first type of network is smaller than a variation threshold.

When any of the measurement relaxation conditions described above is satisfied, a first radio measurement result of the first user device in the first type of network may be determined at least according to the obtained second radio measurement result of the second user device in a first type of network. Alternatively, when two or more of the measurement relaxation conditions described above are satisfied, a first radio measurement result of the first user device in the first type of network is determined at least according to the obtained second radio measurement result of the second user device in a first type of network.

Herein, the second type of network may be a short-distance communication network, such as a Bluetooth connection. When the first user device is connected with the second user device through the second type of network, the first user device and the second user device are close to each other, and have the similar radio measurement results. Thus, the radio measurement result of the first user device in the first type of network may be determined according to the obtained radio measurement result of the second user device in a first type of network.

A signal strength threshold, measured by the first user device, of the second type of network may be used for defining the distance between the first user device and the second user device. The larger the signal strength threshold is, the smaller the distance between the first user device and the second user device is, and the closer the actual radio measurement results of the first user device and the second user device are.

The smaller the first distance threshold is, the smaller the distance between the first user device and the second user device is, and the closer the actual radio measurement results of the first user device and the second user device are.

A signal strength, measured by the first user device, of the first type of network may be used for characterizing a distance between the first user device and a center of a serving cell. The smaller the distance between the first user device and the center of the serving cell is, the smaller the environmental interference received by the radio signal transmission is. When the first user device is connected with the second user device through the second type of network, the radio measurement results of the first user device and the second user device are close to each other. The second signal strength threshold may be a signal strength in an area where a signal of the serving cell is less affected by an environment, such as a central area of the serving cell. In the area, the radio measurement result of the first user device in the first type of network may be determined according to the obtained radio measurement result of the second user device in a first type of network.

A variation value of the signal strength, measured by the first user device within a predetermined time interval, of the first type of network may be used for characterizing a movement condition, within the predetermined time interval, of the first user device, such as a movement speed. The lower the movement speed of the first user device is, the smaller the variation of the distance between the first user device and the base station and the variation of the distance between the second user device and the base station are, and the closer the radio measurement results of the first user device and the second user device are. Thus, the radio measurement result of the first user device in the first type of network may be determined according to the obtained radio measurement result of the second user device in a first type of network.

In an example, the method further includes transmitting, by the first user device, bundling information to the base station, where the bundling information is used for indicating that the first user device is bundled to the second user device through the second type of network.

Herein, bundling through the second type of network may be that the first user device is bundled to the second user device through the second type of network. The first user device and the second user device may transmit the bundling information, to inform the base station of a bundling relation. After the base station determines the bundling relation, when the first user device satisfies the measurement relaxation condition, the radio measurement result of the first user device in the first type of network may be determined according to the radio measurement result of the second user device in a first type of network.

In an example, the bundling information transmitted by the first user device contains identification information of the second user device.

The bundling information transmitted by the first user device may contain the identification information of the second user device, and after receiving the bundling information, the base station may determine that a bundling information transmission terminal, that is, the first user device and the second user device identified by the identification information are in the bundling relation.

The bundling information transmitted by the second user device may contain identification information of the first user device. After receiving the bundling information, the base station may determine that a bundling information transmission terminal, that is, the second user device and the first user device identified by the identification information are in the bundling relation.

In an example, the method further includes at least one of receiving, by the first user device, information of the measurement relaxation condition sent by the base station; and obtaining, by the first user device or the base station, information of the measurement relaxation condition pre-negotiated or specified in a protocol.

The measurement relaxation condition may be determined by a network side, and sent to a first user device by the base station through the condition information.

The measurement relaxation condition may also be pre-negotiated or specified in a communication protocol, and stored in a memory as the condition information, which is read by the first user device or the base station when in use. The memory may be a local memory, or a remote memory such as a cloud.

In an example, the method further includes receiving, by the first user device, uplink measurement signal transmission configuration sent by the base station; and transmitting, by the first user device an uplink measurement signal to the base station in a frequency domain, and/or a time domain, and/or a cell indicated by the uplink measurement signal transmission configuration.

When performing the uplink radio measurement, the base station may schedule the uplink measurement signal through an instruction, etc. The first user device is only required to transmit, in the frequency domain, and/or the time domain, and/or the cell where the base station is required to measure the uplink measurement signal of the first user device, the uplink measurement signal to the base station. In this way, a transmission load on the uplink measurement signal may be reduced, to reduce the power consumption.

In an example, the uplink measurement signal includes a sounding reference signal (SRS).

The first user device and the second user device may transmit the sounding reference signal (SRS) according to scheduling of the base station, and the base station measures the SRS, to determine the uplink radio measurement result.

Figure 6:
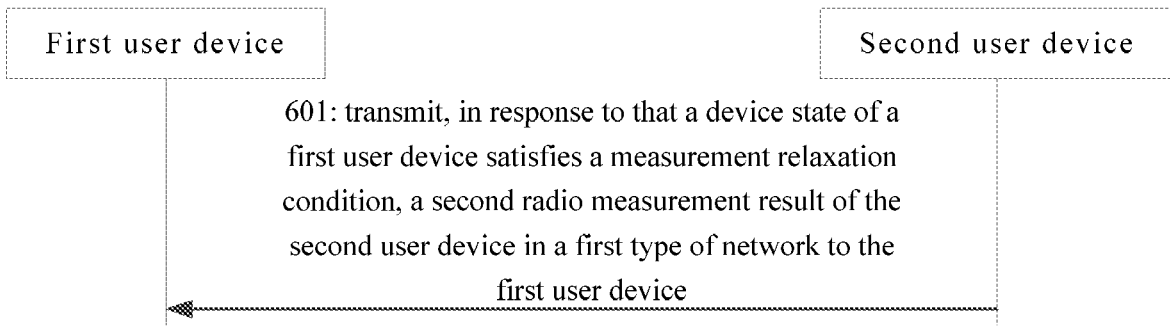
FIG. 6 is a schematic flow chart of a signal measurement method shown according to an example.

As shown in FIG. 6, the present example provides a signal measurement method, which may be applied to a second user device for radio communication. The signal measurement method may include Step 601: transmit, in response to that a device state of a first user device satisfies a measurement relaxation condition, a second radio measurement result of the second user device in a first type of network to the first user device;

the transmitted second radio measurement result being used by the first user device in a measurement relaxation mode, to determine a first radio measurement result of the first user device in the first type of network.

Herein, the first user device may be a communication device having a smaller battery capacity or less remaining power. The second user device may be a communication device having a larger battery capacity or more remaining power.

For example, the first user device may be a wearable device such as a smart watch, a sports bracelet or the like, or a mobile phone or the like having less remaining power. The second user device may be a mobile phone or the like having more power.

For example, the first user device may have a lower frequency of use by a user or a smaller application range, while the second user device has a higher frequency of use by a user than the first user device or a wider application range than the first user device. For example, the first user device may be a wearable device; and the second user device is a mobile phone. The user is more likely to use the mobile phone to talk, socialize, order items, and check news. The user may use the wearable device for monitoring sleep, etc.

The first user device and the second user device may be capable of accessing the first type of network. For example, the first type of network may be a 4G or 5G cellular mobile communication network, which may be accessed by the smart watch and the mobile phone.

Radio measurement results may be an uplink radio measurement result of an uplink signal and/or a downlink radio measurement result of a downlink signal. The downlink radio measurement result is obtained by measuring, by the user device, a downlink signal of a base station. The uplink radio measurement result is obtained by measuring, by the base station, an uplink measurement signal of the user device. Herein, a radio signal measurement may be a signal quality measurement, etc. on uplink signals or downlink signals of the first type of network. The uplink signals or downlink signals of the first type of network may include uplink signals or downlink signals for different frequency ranges and different cells. The measurement result obtained through the radio signal measurement may be used as a basis for handover between cells, reselecting the cells or the like. The uplink signals may be measured by the base station, and the downlink signals may be measured by the user device.

The first type of network herein may include: the cellular mobile communication network. The cellular mobile communication network may include: a radio communication network between the base station and the user device.

The measurement relaxation mode may be: a measurement mode in which the first user device does not perform a radio measurement in the first type of network in a downlink radio measurement, or a measurement mode in which a radio measurement frequency is reduced relative to a non-measurement relaxation mode in a downlink radio measurement, or a measurement mode in which the base station does not perform an uplink radio measurement on the first user device in an uplink radio measurement, or a measurement mode in which the base station reduces, relative to a non-measurement relaxation mode, a measurement frequency on an uplink measurement signal of the first user device in an uplink radio measurement. The non-measurement relaxation mode is one other than the measurement relaxation mode.

The measurement relaxation condition is one for entering the measurement relaxation mode. The measurement relaxation condition may be one in which the first user device and the second user device are positioned at places where close radio measurement results are provided. For example, the measurement relaxation condition may be that a distance interval between the first user device and the second user device is smaller than a distance threshold, or a distance between the first user device and the base station and a distance between the second user device and the base station are smaller than a distance threshold. When the first user device and the second user device are close to each other, the radio measurement results of the first user device in the first type of network and the second user device are close to each other. The first user device or the base station may determine the radio measurement result of the first user device according to the radio measurement result of the second user device in a first type of network.

The step of determining a device state of a first user device may include, but is not limited to, determine a position relation between the first user device and the second user device, or determine a connection condition between the first user device and the second user device through a short-distance communication network therebetween. The distance between the first user device and the second user device may be determined through positioning, etc. A relative distance may also be determined through a signal strength of the short-distance communication network, etc. For example, when the distance between the first user device and the second user device is smaller than a predetermined distance threshold, the radio measurement result of the second user device may be determined as the radio measurement result of the first user device. The first user device may transmit the device state to the base station through the first type of network, and the base station performs an uplink signal measurement according to the device state of the first user device.

When the first user device is in radio connection with the second user device through short-distance communication, it is indicated that the first user device and the second user device are close to each other. In this case, a measurement result of the second user device in a first type of radio network, may be directly used as the radio measurement result of the first user device in the first type of radio network, or assist in determining the radio measurement result of the first user device in the first type of radio network.

When a signal of a connection established between the first user device and the second user device through the short-distance communication is strong enough, it is also indicated that the first user device and the second user device are close to each other. In this case, a measurement result of the second user device in the first type of radio network, may be directly used as a radio measurement result of the first user device in the first type of radio network, or assist in determining the radio measurement result of the first user device in the first type of radio network.

Herein, for the downlink signal measurement, the second user device with more power may perform the radio signal measurement, and the first user device does not perform the radio signal measurement or reduces a measurement frequency and narrows a measurement range. For the uplink signal measurement, the base station may measure an uplink measurement signal of the second user device with more power, and the first user device may not transmit the uplink measurement signal or may reduce transmission of the uplink measurement signal. The first user device or the base station may determine, based on the radio measurement result of the second user device, the radio measurement result of the first user device.

In this way, the second user device performs the radio signal measurement, the radio measurement result of the first user device is determined according to the radio measurement result of the second user device, and the first user device does not perform or reduces the radio signal measurement, so that power consumed by the first user device for the radio signal measurement may be reduced, to prolong a standby time of the first user device.

In an example, step 601 may include: transmit a second downlink radio measurement result of the second user device in a first type of network to the first user device; and the step of the transmitted second radio measurement result being used by the first user device in a measurement relaxation mode, to determine a first radio measurement result of the first user device in the first type of network includes:

the transmitted second downlink radio measurement result is used by the first user device, to determine a first downlink radio measurement result of the first user device in the first type of network.

The base station of the first type of network, etc. may transmit measurement configuration to instruct the first user device to perform the radio signal measurement on the downlink signal. Since the first user device including the wearable devices such as the smart watch and the bracelet has small battery power, frequent radio signal measurements will consume a battery current and shorten a standby time. After receiving the measurement configuration, the first user device may not perform or may reduce the radio signal measurement, for example, reduce a measurement frequency, narrow a signal range, etc., if the device state of the first user device satisfies the measurement relaxation condition. The first user device may determine the downlink radio measurement result of the first user device according to the downlink radio measurement result obtained by performing, by the second user device, the radio signal measurement in the first type of network. Thus, the first user device may reduce the power consumed by the radio signal measurement.

For example, the first user device is a smart watch, the second user device is a mobile phone, and the first type of network is a 5G cellular mobile communication network. The base station of the 5G cellular mobile communication network transmits measurement configuration to the smart watch, to instruct the smart watch to perform a radio signal measurement on the 5G cellular mobile communication network. The smart watch may not perform a radio signal measurement, and may take a downlink radio measurement result of the mobile phone as a downlink radio measurement result of the smart watch. The smart watch may also combine the downlink radio measurement result of the smart watch with a downlink radio measurement result obtained by performing some radio signal measurements, to obtain a complete downlink radio measurement result, so that the smart watch reduces the radio signal measurement, to save on power consumed by the smart watch.

The smart watch and the mobile phone are close to each other. Accordingly, radio signal measurement results of the smart watch and the mobile phone are close to each other. The measurement result obtained by the mobile phone may be used as a basis for the smart watch to reselect a cell, etc.

In an example, the a transmitted second downlink radio measurement result of the first type of network for a channel state indication (CSI) signal; and the first downlink radio measurement result of the first user device in the first type of network comprises: a first downlink radio measurement result of the first user device for the CSI signal of the first type of network.

For the downlink radio measurement, a signal quality of the CSI signal may be measured. The downlink radio measurement result may be an RSRP measurement result and/or an RSRQ measurement result of the CSI signal.

In an example, the second user device being a device bundled to the first user device through the second type of network.

The first type of network and the second type of network may have different communication protocols, communication frequency ranges, and/or power ranges. The first type of network may be a radio communication network having a larger coverage area and larger transmission power of the radio signal. The second type of network may be a radio communication network having a smaller coverage area and smaller transmission power of the radio signal.

For example, the first type of network may be a 4G or 5G cellular mobile communication network. The first type of network may be a short-distance communication network such as Bluetooth (BT), low-power consumption Bluetooth, Wi-Fi or the like.

As shown in FIG. 5, both the first user device and the second user device may access the first type of network. Both the first user device and the second user device may also access the second type of network, and the first user device is connected with the second user device through the second type of network. For example, the smart watch and the mobile phone may access the 4G or 5G cellular mobile communication network, and are connected with each other through the low-power consumption Bluetooth.

In an example, the step of transmitting a second radio measurement result of the second user device in a first type of network includes transmitting the second radio measurement result of the second user device in a first type of network through the second type of network.

The first user device may receive the downlink radio measurement result of the second user device through the second type of network.

In an example, the in response to a condition that a device state of a first user device satisfies a measurement relaxation condition includes in response to conditions that the first user device is bundled to the second user device through the second type of network, and the device state of the first user device satisfies the measurement relaxation condition.

Herein, the second type of network may be a short-distance communication network, such as a Bluetooth connection. When the first user device is connected with the second user device through the second type of network, the first user device and the second user device are close to each other, and have the similar radio measurement results. Thus, the radio measurement result of the first user device in the first type of network may be determined according to the obtained radio measurement result of the second user device in a first type of network.

Figure 7:
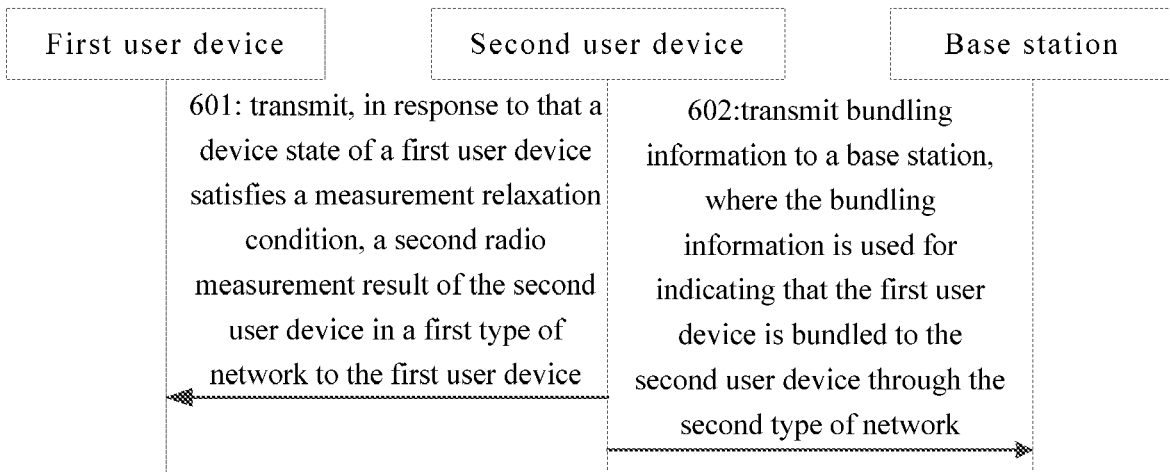
FIG. 7 is a schematic flow chart of another signal measurement method shown according to an example.

In an example, as shown in FIG. 7, the method further includes step 602. Step 602 includes transmitting bundling information to a base station, where the bundling information is used for indicating that the first user device is bundled to the second user device through the second type of network.

Herein, bundling through the second type of network may be that the first user device is bundled to the second user device through the second type of network. The first user device and the second user device may transmit the bundling information, to inform the base station of a bundling relation. After the base station determines the bundling relation, when the first user device satisfies the measurement relaxation condition, the radio measurement result of the first user device in the first type of network may be determined according to the radio measurement result of the second user device in a first type of network.

In an example, the bundling information transmitted by the second user device contains identification information of the first user device.

The bundling information transmitted by the second user device may contain identification information of the first user device. After receiving the bundling information, the base station may determine that a bundling information transmission terminal, that is, the second user device and the first user device identified by the identification information are in the bundling relation.

In an example, the method further includes receiving uplink measurement signal transmission configuration sent by the base station; and transmitting an uplink measurement signal to the base station in a frequency domain, and/or a time domain, and/or a cell indicated by the uplink measurement signal transmission configuration When performing the uplink radio measurement, the base station may schedule the uplink measurement signal through an instruction, etc. The first user device and the second user device are only required to transmit, in the frequency domain, and/or the time domain, and/or the cell where the base station is required to measure the uplink measurement signals of the first user device, the uplink measurement signals to the base station. In this way, a transmission load on the uplink measurement signal may be reduced, to reduce the power consumption.

In an example, the uplink measurement signal includes a sounding reference signal (SRS).

The first user device and the second user device may transmit the sounding reference signal (SRS) according to scheduling of the base station, and the base station measures the SRS, to determine the uplink radio measurement result.

A specific example is provided below with reference to any of the examples described above:

1. A wearable device performs a measurement relaxation in a specific scenario. Herein, the measurement relaxation may mean that the wearable device does not perform a radio signal measurement or performs a limited radio signal measurement, that is, the measurement relaxation may be to measure some items relative to a normal radio signal measurement.

As an example, the measurement relaxation includes a case that the wearable device does not perform the measurement.

2. A network side may configure conditions of the measurement relaxation for the wearable device.

3. The conditions of the measurement relaxation configured by the network side for the wearable device include: the wearable device is close enough to a handheld terminal.

a) As an example, the handheld terminal is bundled to the wearable device, of which a bundling process is an application layer protocol.

b) As an example, the wearable device is close enough to the handheld terminal, that is, the wearable device is connected with the handheld terminal in a short-distance communication manner. The short-distance communication manners include Bluetooth, wlan, etc.

c) As an example, the wearable device is close enough to the handheld terminal, that is, the wearable device detects that a short-distance connection signal strength of the handheld terminal exceeds a threshold.

d) The conditions of the measurement relaxation configured by the network side for the wearable device include: a condition that the wearable device is close enough to the handheld terminal may be pre-specified in a protocol (including in a hardcode manner), or the network side informs the wearable device through common signaling or dedicated signaling.

4. The conditions of the measurement relaxation configured by the network side for the wearable device include: the wearable device is in a center of a cell and/or in a low movement state; and whether the wearable device is in the center of the cell and/or in the low mobility state may be determined based on an existing protocol.

5. The network side configures a measurement relaxation for the wearable device, including a measurement relaxation on an uplink signal or/and a downlink signal.

6. The network side configures a measurement relaxation for the wearable device, and a downlink signal measurement included is a channel state indication (CSI) measurement, etc.

a) As an example, the CSI measurement is an RSRP measurement.

b) As an example, the CSI measurement is an RSRQ measurement.

c) As an example, the downlink signal measurement is in a cell level or a beam level measurement result.

7. The network side configures a measurement relaxation for the wearable device, and an uplink signal measurement included is an SRS measurement, etc.

8. Measurement results of the wearable device may directly employ a measurement result of the handheld terminal or may be derived from the measurement result of the handheld terminal.

a) As an example, the measurement results of the wearable device are derived from the measurement result of the handheld terminal, including: add the measurement result of the handheld terminal with offset.

b) As an example, for a downlink measurement: the offset is a gain difference between a power amplifier of the wearable device and a power amplifier of the handheld terminal.

c) As an example, for an uplink measurement: the offset is a difference between transmission power of the wearable device and transmission power of the handheld terminal.

d) As an example, the measurement results of the wearable device are derived from the measurement result of the handheld terminal, including: average measurement results of N periods of the handheld terminal.

e) As an example, the measurement results of the wearable device directly employ the measurement result of the handheld terminal or are derived from the measurement result of the hand-held terminal, and informed to the wearable device by the network side. Relevant parameters in a process of deriving from the measurement result of the handheld terminal, such as the offset and the N mentioned above, are all informed to the wearable device by the base station through dedicated signaling or common signaling, or written in the wearable device in a hardcode manner, or pre-specified in a protocol.

9. The measurement results of the wearable device may be directly derived from both the measurement results of the wearable device and the measurement result of the handheld terminal.

a) As an example, the measurement results of the wearable device and the measurement result of the handheld terminal may be combined based on a frequency. For example, the wearable device measures some carrier frequencies, and measurement results of other carrier frequencies may be obtained from the measurement result of the handheld terminal. A special case is that the wearable device measures an intra-frequency, while measurement results of inter-frequencies are obtained from the handheld terminal.

b) As an example, the measurement results of the wearable device and the measurement result of the handheld terminal may be divided into a present cell and neighboring cells. For example, the wearable device measures the present cell, and measurement results of other neighboring cells may be obtained from the measurement result of the handheld terminal.

c) As an example, the measurement results of the wearable device and the measurement result of the handheld terminal may be combined based on a time. For example, the wearable device measures some measurement time points, and measurement results of other time points may be obtained from the measurement result of the handheld terminal. A special case is that, a measurement is performed once every 20 ms in 200 ms, while the wearable device performs a measurement once every 40 ms, and other sampling points employ the measurement result of the handheld terminal.

10. In a downlink direction, the wearable device may obtain the measurement result of the handheld terminal through an application layer such as Bluetooth.

11. In an uplink direction, the base station is required to obtain a bundling relation between the wearable device and the handheld terminal bundled thereto, to obtain the measurement results of the wearable device.

a) As an example, the wearable device may inform the base station of the bundling relation by informing the base station of an identification of the handheld terminal bundled thereto through dedicated signaling.

b) As an example, the handheld terminal may inform the base station of the bundling relation by informing the base station of an identification of the wearable device bundled thereto through dedicated signaling.

Figure 8:
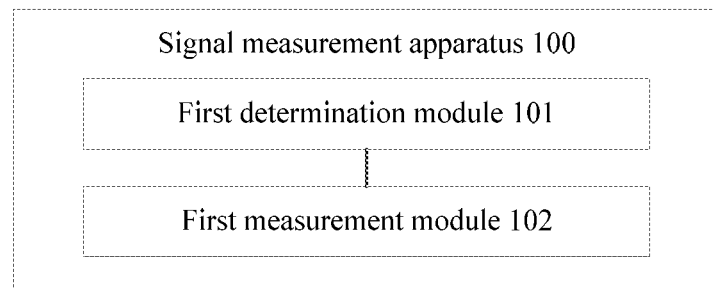
FIG. 8 is a structural block diagram of components of a signal measurement apparatus shown according to an example.

An example of the disclosure further provides a signal measurement apparatus. FIG. 8 is a structural schematic diagram of components of the signal measurement apparatus 100 provided in the example of the disclosure. As shown in FIG. 8, the signal measurement apparatus 100 include: a first determination module 101 and a first measurement module 102, where the first determination module 101 is configured for determining a device state of a first user device; and the first measurement module 102 is configured for entering, in response to that the device state of the first user device satisfies a measurement relaxation condition, a measurement relaxation mode, and in the measurement relaxation mode, determining a first radio measurement result of the first user device in a first type of network according to at least an obtained second radio measurement result of a second user device in the first type of network.

Figure 9:
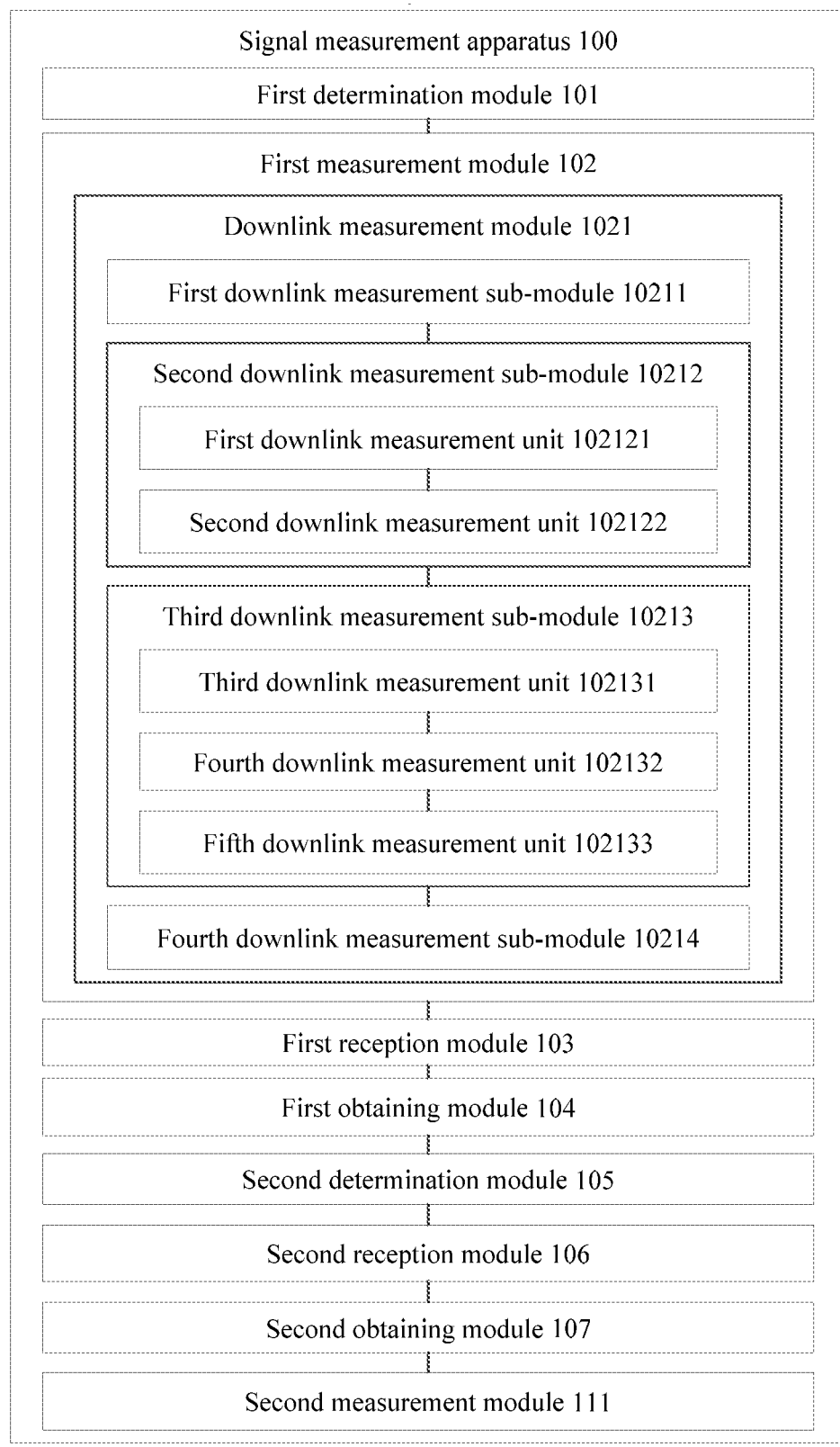
FIG. 9 is a structural block diagram of components of another signal measurement apparatus shown according to an example.

In an example, as shown in FIG. 9, the first measurement module 102 includes:

a downlink measurement module configured for determining a first downlink radio measurement result of the first user device in the first type of network according to at least an obtained second downlink radio measurement result of the second user device in a first type of network.

In an example, the downlink measurement module 1021 includes at least one of the following:

a first downlink measurement sub-module 10211 configured for determining the obtained second downlink radio measurement result as the first downlink radio measurement result of the first user device in the first type of network;

a second downlink measurement sub-module 10212 configured for obtaining the first downlink radio measurement result of the first user device in the first type of network according to the obtained second downlink radio measurement result and a first measurement offset; and a third downlink measurement sub-module 10213 configured for obtaining the first downlink radio measurement result of the first user device in the first type of network according to the obtained second downlink radio measurement result and a third downlink radio measurement result of the first user device in the first type of network.

In an example, the second downlink measurement sub-module 10212 includes:

a first downlink measurement unit 102121 configured for obtaining the first downlink radio measurement result of the first user device in the first type of network by compensating the obtained second downlink radio measurement result with first measurement offset.

In an example, the signal measurement apparatus 100 further includes:

a first reception module 103 configured for receiving the first measurement offset sent by the base station; or, a first obtaining module 104 configured for obtaining the first measurement offset pre-written, pre-negotiated, or specified in a protocol.

In an example, the signal measurement apparatus 100 further includes:

a second determination module 105 configured for determining, by the first user device the first measurement offset based on a gain difference between a radio power amplifier of the first user device and a radio power amplifier of the second user device.

In an example, the second downlink measurement sub-module 10212 includes:

a second downlink measurement unit 102122 configured for determining an average of obtained N second downlink radio measurement results, obtained by measuring by the second user device in N measurement periods respectively, as the first downlink radio measurement result, in a time interval occupied by the N measurement periods of the first user device in the first type of network.

In an example, the signal measurement apparatus 100 further includes:

a second reception module 106 configured for receiving the N sent by the base station; or, a second obtaining module 107 configured for obtaining the N pre-written, pre-negotiated, or specified in a protocol.

In an example, the third downlink measurement sub-module 10213 includes at least one of the following:

a third downlink measurement unit 102131 configured for obtaining the first downlink radio measurement result according to the obtained second downlink radio measurement result measured by the second user device in a first frequency range and the third downlink radio measurement result measured by the first user device in a second frequency range, wherein the first frequency range is different from the second frequency range;

a fourth downlink measurement unit 102132 configured for obtaining the first downlink radio measurement result according to the obtained second downlink radio measurement result measured by the second user device in a first time interval and the third downlink radio measurement result measured by the first user device in a second time interval, wherein the first time interval is different from the second time interval; and a fifth downlink measurement unit 102133 configured for obtaining the first downlink radio measurement result according to the obtained second downlink radio measurement result measured by the second user device in a first cell and the third downlink radio measurement result measured by the first user device in a second cell, wherein the first cell is different from the second cell.

Figure 10:
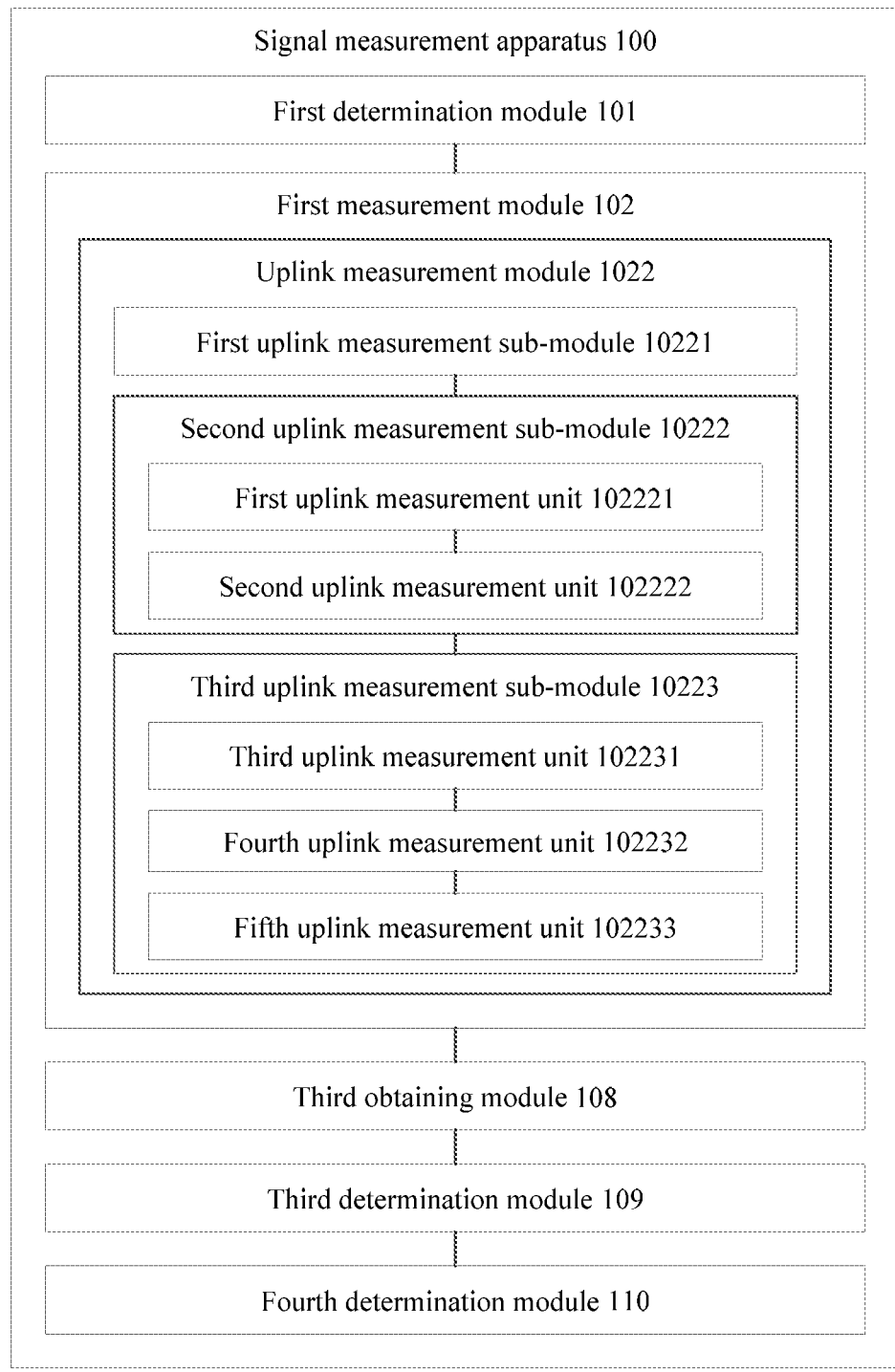
FIG. 10 is a structural block diagram of components of still another signal measurement apparatus shown according to an example.

In an example, as shown in FIG. 10, the first measurement module 102 includes: an uplink measurement module 1022 configured for obtaining a second uplink radio measurement result by measuring an uplink measurement signal sent by the second user device in the first type of network, and determining a first uplink radio measurement result of the first user device in the first type of network according to at least the second uplink radio measurement result.

In an example, the uplink measurement module 1022 includes at least one of the following:
a first uplink measurement sub-module 10221 configured for determining the second uplink radio measurement result as the first uplink radio measurement result of the first user device in the first type of network;
a second uplink measurement sub-module 10222 configured for obtaining the first uplink radio measurement result of the first user device in the first type of network according to the second uplink radio measurement result and a second measurement offset; and
a third uplink measurement sub-module 10223 configured for obtaining the first uplink radio measurement result of the first user device in the first type of network according to the second uplink radio measurement result and a third uplink radio measurement result, measured by the base station of the first user device in the first type of network.

In an example, the second uplink measurement sub-module 10222 includes: a first uplink measurement unit 102221 configured for obtaining the first uplink radio measurement result of the first user device in the first type of network by compensating the second uplink radio measurement result with second measurement offset.

In an example, the signal measurement apparatus 100 further includes: a third obtaining module 108 configured for obtaining the second measurement offset pre-written, pre-negotiated, or specified in a protocol.

In an example, the signal measurement apparatus 100 further includes: a third determination module 109 configured for determining, by the base station the second measurement offset based on a difference between transmission power of the first user device and transmission power of the second user device.

In an example, the second uplink measurement sub-module 10222 includes: a second uplink measurement unit 102222 configured for determining an average of M second uplink radio measurement results, obtained by measuring in M measurement periods respectively, as the first uplink radio measurement result of the first user device in the first type of network in a time interval occupied by the M measurement periods.

In an example, the signal measurement apparatus 100 further includes: a fourth determination module 110 configured for obtaining the M pre-written, pre-negotiated, or specified in a protocol.

In an example, the third uplink measurement sub-module 10223 includes at least one of the following:
a third uplink measurement unit 102231 configured for obtaining the first uplink radio measurement result according to the second uplink radio measurement result, measured in a third frequency range and the third uplink radio measurement result measured in a fourth frequency range, wherein the third frequency range is different from the fourth frequency range;
a fourth uplink measurement unit 102232 configured for obtaining the first uplink radio measurement result according to the second uplink radio measurement result, measured in a third time interval and the third uplink radio measurement result measured in a fourth time interval, wherein the third time interval is different from the fourth time interval; and
a fifth uplink measurement unit 102233 configured for obtaining the first uplink radio measurement result according to the second uplink radio measurement result measured in a third cell and the third uplink radio measurement result measured in a fourth cell, wherein the third cell is being different from the fourth cell.

In an example, as shown in FIG. 9, the signal measurement apparatus 100 further includes: a second measurement module 111 configured for performing, by the first user device in response to a condition that the device state of the first user device does not satisfy the measurement relaxation condition, a downlink radio measurement in the first type of network.

In an example, the downlink measurement module 1021 includes: a fourth downlink measurement sub-module 10214 configured for determining a first downlink radio measurement result of the first user device, for a channel state indication (CSI) signal according to at least an obtained second downlink radio measurement result for the CSI signal of the first type of network.

In an example, the first downlink radio measurement result of the first user device in the first type of network includes: a first downlink radio measurement result of the first user device in a predetermined cell of the first type of network and/or a first downlink radio measurement result of the first user device in a predetermined beam of the first type of network.

In an example, the obtained second downlink radio measurement result of the second user device in a first type of network includes: the second downlink radio measurement result, obtained through a second type of network in the first type of network, of the second user device.

In an example, the second user device being a device bundled to the first user device through the second type of network.

In an example, the measurement relaxation condition includes at least one of the following:
the first user device being a device bundled to the second user device through a second type of network;
a signal strength of the second type of network measured by the first user device is greater than a first signal strength threshold;
a distance between the first user device and the second user device is smaller than a first distance threshold;
a signal strength of the first type of network measured by the first user device is greater than a second signal strength threshold; and a variation value of a signal strength, measured by the first user device within a predetermined time interval, of the first type of network is smaller than a variation threshold.

Figure 11:
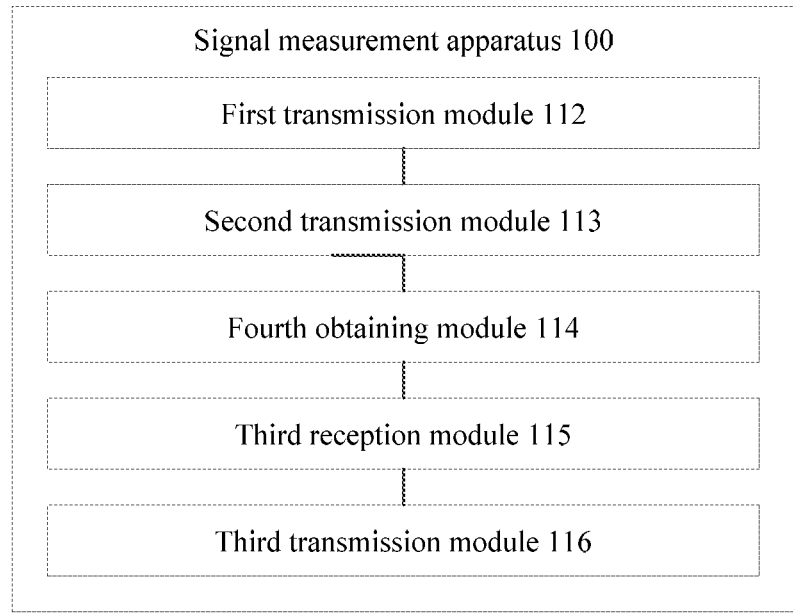
FIG. 11 is a structural block diagram of components of still another signal measurement apparatus shown according to an example.

In an example, as shown in FIG. 11, the signal measurement apparatus 100 further includes: a first transmission module 112 configured for transmitting, by the first user device, bundling information to a base station, wherein the bundling information is used for indicating that the first user device is bundled to the second user device through a second type of network.

In an example, the bundling information transmitted by the first user device contains identification information of the second user device.

In an example, the signal measurement apparatus 100 further includes: a second transmission module 113 configured for receiving, by the first user device, information of the measurement relaxation condition sent by the base station; and/or, a fourth obtaining module 114 configured for obtaining, by the first user device or the base station, information of the measurement relaxation condition pre-negotiated or specified in a protocol.

In an example, the apparatus signal measurement 100 further includes:
a third reception module 115 configured for receiving, by the first user device, uplink measurement signal transmission configuration sent by the base station; and
a third transmission module 116 configured for transmitting, by the first user device an uplink measurement signal to the base station in a frequency domain, and/or a time domain, and/or a cell indicated by the uplink measurement signal transmission configuration.

In an example, the uplink measurement signal includes a sounding reference signal (SRS).

Figure 12:
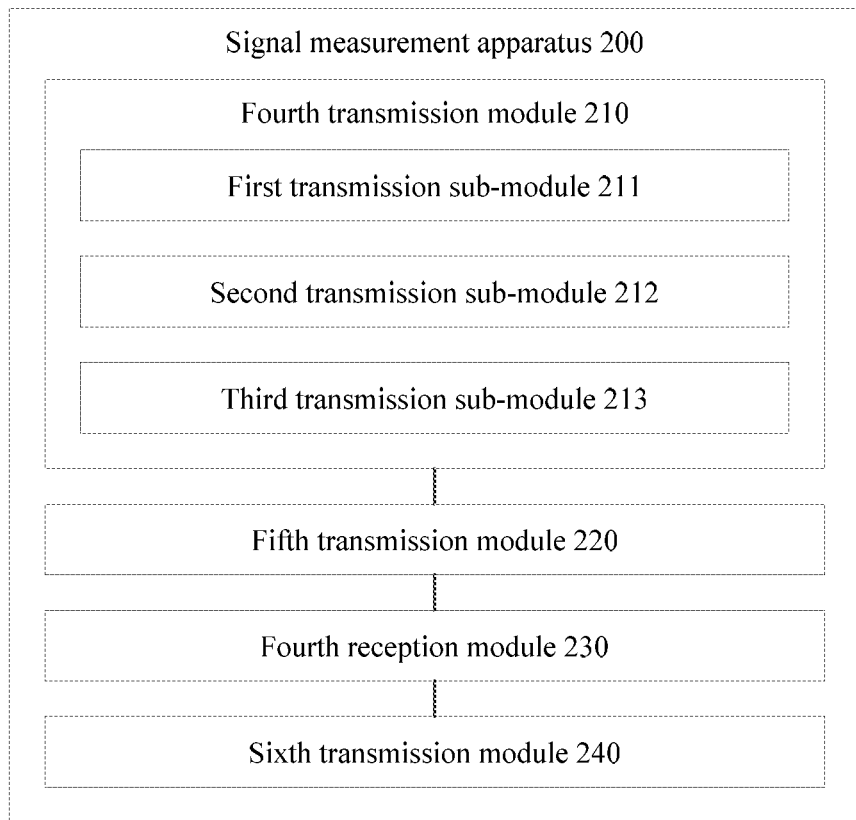
FIG. 12 is a structural block diagram of components of yet another signal measurement apparatus shown according to an example.

An example of the disclosure further provides a signal measurement apparatus applied to a second user device in a radio communication system. FIG. 12 is a structural schematic diagram of components of the signal measurement apparatus 200. As shown in FIG. 12, the signal measurement apparatus 200 include: a fourth transmission module 210, where
the fourth transmission module 210 is configured for transmitting, in response to that a device state of a first user device satisfies a measurement relaxation condition, a second radio measurement result of the second user device in a first type of network to the first user device;
the transmitted second radio measurement result being used by the first user device in a measurement relaxation mode, to determine a first radio measurement result of the first user device in the first type of network.

In an example, the fourth transmission module 210 includes:
a first transmission sub-module 211 configured for transmitting a second downlink radio measurement result of the second user device in a first type of network to the first user device; and
the transmitted second radio measurement result being used by the first user device in a measurement relaxation mode, to determine a first radio measurement result of the first user device in the first type of network comprises:
the transmitted second downlink radio measurement result being used by the first user device, to determine a first downlink radio measurement result of the first user device in the first type of network.

In an example, the transmitted second downlink radio measurement result in the first type of network includes:
a transmitted second downlink radio measurement result of the first type of network for a channel state indication (CSI) signal; and
the first downlink radio measurement result of the first user device in the first type of network comprises: a first downlink radio measurement result of the first user device for the CSI signal of the first type of network.

In an example, the second user device being a device bundled to the first user device through the second type of network.

In an example, the fourth transmission module 210 includes: a second transmission sub-module 212 configured for transmitting the second radio measurement result of the second user device in a first type of network through the second type of network.

In an example, the fourth transmission module 210 includes: a third transmission sub-module 213 configured for responding to conditions that the first user device is bundled to the second user device through the second type of network, and the device state of the first user device satisfies the measurement relaxation condition.

In an example, the signal measurement apparatus 200 further includes: a fifth transmission module 220 configured for transmitting bundling information to a base station, where the bundling information is used for indicating that the first user device is bundled to the second user device through the second type of network.

In an example, the bundling information transmitted by the second user device contains identification information of the first user device.

In an example, the signal measurement apparatus 200 further includes: a fourth reception module 230 configured for receiving uplink measurement signal transmission configuration sent by the base station; and a sixth transmission module 240 configured for transmitting an uplink measurement signal to the base station in a frequency domain, and/or a time domain, and/or a cell indicated by the uplink measurement signal transmission configuration.

In an example, the uplink measurement signal includes a sounding reference signal (SRS).

In an example, the first determination module 101, the first measurement module 102, the first reception module 103, the first obtaining module 104, the second determination module 105, the second reception module 106, the second obtaining module 107, the third obtaining module 108, the third determination module 109, the fourth determination module 110, the second measurement module 111, the first transmission module 112, the second transmission module 113, the fourth obtaining module 114, the third reception module 115, the third transmission module 116, the fourth transmission module 210, the fifth transmission module 220, the fourth reception module 230, the sixth transmission module 240, etc. may be implemented through one or more central processing units (CPU), a graphics processor unit (GPU), a baseband processor (BP), an application specific integrated circuit (ASIC), a digital signal processor (DSP), a programmable logic device (PLD), a complex programmable logic device (CPLD), a field-programmable gate array (FPGA), a general-purpose processor, a controller, a micro controller unit (MCU), a microprocessor or the like, for executing the aforementioned methods.

Figure 13:
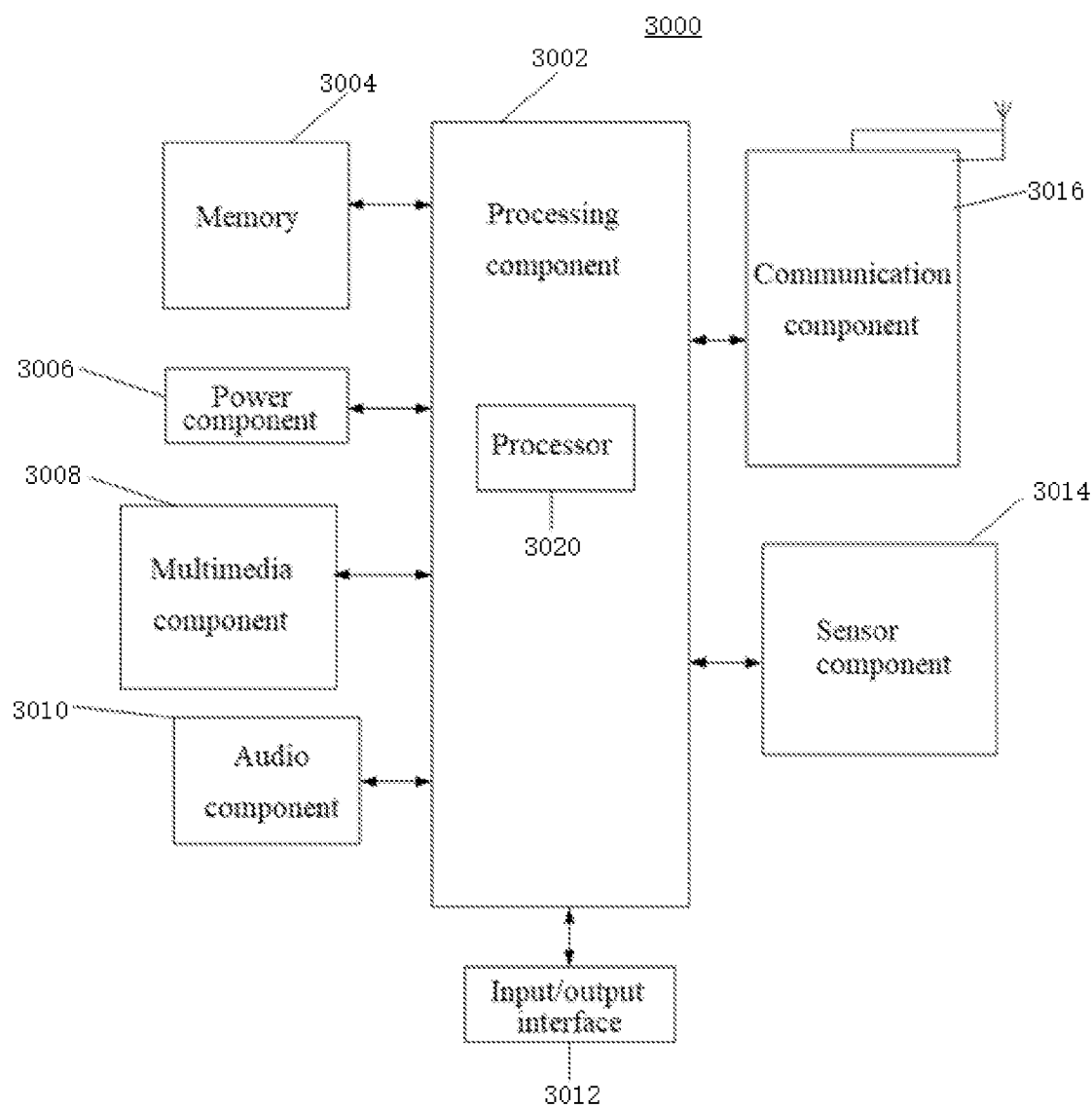
FIG. 13 is a block diagram of a signal measurement apparatus shown according to an example.

FIG. 13 is a block diagram of a signal measurement apparatus 3000 shown according to an example. For example, the signal measurement apparatus 3000 may be a mobile phone, a computer, a digital broadcast terminal, a message transceiving device, a game console, a tablet device, a medical device, a fitness device, a personal digital assistant or the like.

With reference to FIG. 13, the signal measurement apparatus 3000 may include one or more of the following assemblies: a processing assembly 3002, a memory 3004, a power supply assembly 3006, a multimedia assembly 3008, an audio assembly 3010, an interface 3012 for input/output (I/O), a sensor assembly 3014, and a communication assembly 3016.

Generally, the processing assembly 3002 controls an overall operation of the signal measurement apparatus 3000, such as operations associated with display, telephone calls, data communication, camera operations, and recording operations. The processing assembly 3002 may include one or more processors 3020, to execute instructions, so as to complete all or some of steps of the methods described above. Further, the processing assembly 3002 may include one or more modules that facilitate interaction between the processing assembly 3002 and other assemblies. For example, the processing assembly 3002 may include a multimedia module, to facilitate interaction between the multimedia assembly 3008 and the processing assembly 3002.

The memory 3004 is configured to store various types of data, to support the operations at the signal measurement apparatus 3000. For example, these data include instructions for any application or method operating at the signal measurement apparatus 3000, contact data, phonebook data, messages, pictures, video, etc. The memory 3004 may be implemented through any type of volatile and non-volatile memory devices or their combinations, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply assembly 3006 provides power for various assemblies of the signal measurement apparatus 3000. The power supply assembly 3006 may include a power supply management system, one or more power supplies, and other assemblies associated with power generating, managing, and distributing for the signal measurement apparatus 3000.

The multimedia assembly 3008 includes a screen that provides an output interface between the signal measurement apparatus 3000 and the user. In some examples, the screen may include a liquid crystal display (LCD) and a touch panel (TP). With the touch panel included, the screen may be implemented as a touch screen, to receive an input signal from the user. The touch panel includes one or more touch sensors, to sense touches, swipes, and gestures on the touch panel. Except for sensing a boundary of a touch or swipe action, the touch sensor may also detect a duration and a pressure associated with touch or swipe operations. In some examples, the multimedia assembly 3008 includes a front-facing camera and/or a rear-facing camera. When the signal measurement apparatus 3000 is in an operation mode, such as a photographing mode or a video mode, the front-facing camera and/or the rear-facing camera may receive external multimedia data. Each of the front-facing camera and the rear-facing camera may be a fixed optical lens system or have focal length and optical zoom capacities.

The audio assembly 3010 is configured to output and/or input audio signals. For example, the audio assembly 3010 includes a microphone (MIC) configured to receive an external audio signal when the signal measurement apparatus 3000 is in operation mode, such as a call mode, a recording mode, and a voice recognition mode. The received audio signal may be further stored in the memory 3004 or transmitted via the communication assembly 3016. In some examples, the audio assembly 3010 further includes a speaker for outputting the audio signal.

The interface 3012 for I/O provides an interface between the processing assembly 3002 and a peripheral interface module such as a keyboard, a click wheel, buttons, etc. These buttons may include, but are not limited to: a home button, a volume button, a start button, and a lock button.

The sensor assembly 3014 includes one or more sensors for providing state assessments of various aspects of the signal measurement apparatus 3000. For example, the sensor assembly 3014 may detect an opened/closed state of the signal measurement apparatus 3000, and relative positioning of the assemblies, such as a display and a keypad of the signal measurement apparatus 3000. The sensor assembly 3014 may further detect a change in position of the signal measurement apparatus 3000 or an assembly of the signal measurement apparatus 3000, a contact or not between the user and the signal measurement apparatus 3000, an orientation or acceleration/deceleration of the signal measurement apparatus 3000, and a change in temperature of the signal measurement apparatus 3000. The sensor assembly 3014 may include a proximity sensor configured to detect the presence of a nearby object in the absence of any physical contact. The sensor assembly 3014 may further include a light sensor, such as a complementary metal oxide semiconductor (CMOS) or a charged coupled device (CCD) image sensor for use in imaging applications. In some examples, the sensor assembly 3014 may further include an acceleration sensor, a gyroscopic sensor, a magnetic sensor, a pressure sensor, or a temperature sensor.

The communication assembly 3016 is configured to facilitate wired or radio communication between the signal measurement apparatus 3000 and other devices. The signal measurement apparatus 3000 may access a radio network based on a communication standard, such as Wi-Fi, 2G or 3G, or their combination. In an example, the communication assembly 3016 receives a broadcast signal or broadcast-associated information from an external broadcast management system via a broadcast channel In an example, the communication assembly 3016 further includes a near field communication (NFC) module to facilitate short-distance communication. For example, the NFC module may be implemented based on a radio frequency identification (RFID) technology, an infrared data association (IrDA) technology, an ultra wideband (UWB) technology, a Bluetooth (BT) technology, etc.

In an example, the signal measurement apparatus 3000 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or the like configured to perform the methods described above.

In an example, further provided is a non-transitory computer-readable storage medium including instructions, for example a memory 3004 including instructions which are executable by a processor 3020 of the signal measurement apparatus 3000, to complete the methods described above. For example, the non-transitory computer-readable storage medium may be an ROM, a random access memory (RAM), a compact disk-read only memory (CD-ROM), a magnetic tape, a floppy disk, an optical data storage device, etc.

According to a first aspect of an embodiment of the present disclosure, a signal measurement method is provided, including:

determining a device state of a first user device;

entering, in response to that the device state of the first user device satisfies a measurement relaxation condition, a measurement relaxation mode, and in the measurement relaxation mode, determining a first radio measurement result of the first user device in a first type of network according to at least an obtained second radio measurement result of a second user device in the first type of network.

In an example, the step of determining a first radio measurement result of the first user device in a first type of network according to at least an obtained second radio measurement result of a second user device in the first type of network includes:

determining, by the first user device, a first downlink radio measurement result of the first user device in the first type of network according to at least an obtained second downlink radio measurement result of the second user device in the first type of network.

In an example, the step of determining a first radio measurement result of the first user device in a first type of network according to at least an obtained second radio measurement result of a second user device in the first type of network includes at least one of the following:

determining the obtained second downlink radio measurement result as the first downlink radio measurement result of the first user device in the first type of network;

obtaining the first downlink radio measurement result of the first user device in the first type of network according to the obtained second downlink radio measurement result and a first measurement offset; and obtaining the first downlink radio measurement result of the first user device in the first type of network according to the obtained second downlink radio measurement result and a third downlink radio measurement result of the first user device in the first type of network.

In an example, the step of obtaining the first downlink radio measurement result of the first user device in the first type of network according to the obtained second downlink radio measurement result and a first measurement offset includes:

obtaining the first downlink radio measurement result of the first user device in the first type of network by compensating the obtained second downlink radio measurement result with first measurement offset.

In an example, the method further includes:

receiving, by the first user device, the first measurement offset sent by a base station; or, obtaining, by the first user device, the first measurement offset pre-written, pre-negotiated, or specified in a protocol.

In an example, the method further includes:

determining, by the first user device the first measurement offset based on a gain difference between a radio power amplifier of the first user device and a radio power amplifier of the second user device.

In an example, the step of obtaining the first downlink radio measurement result of the first user device in the first type of network according to the obtained second downlink radio measurement result and a first measurement offset includes:

determining an average of obtained N second downlink radio measurement results, obtained by measuring by the second user device in N measurement periods respectively, as the first downlink radio measurement result, in a time interval occupied by the N measurement periods of the first user device in the first type of network.

In an example, the method further includes:

receiving, by the first user device, the N sent by the base station; or, obtaining, by the first user device, the N pre-written, pre-negotiated, or specified in a protocol.

In an example, the step of obtaining the first downlink radio measurement result of the first user device in the first type of network according to the obtained second downlink radio measurement result and a third downlink radio measurement result of the first user device in the first type of network includes at least one of the following:

obtaining the first downlink radio measurement result according to the obtained second downlink radio measurement result measured by the second user device in a first frequency range and the third downlink radio measurement result measured by the first user device in a second frequency range, wherein the first frequency range is different from the second frequency range;

obtaining the first downlink radio measurement result according to the obtained second downlink radio measurement result measured by the second user device in a first time interval and the third downlink radio measurement result measured by the first user device in a second time interval, wherein the first time interval is different from the second time interval; and obtaining the first downlink radio measurement result according to the obtained second downlink radio measurement result measured by the second user device in a first cell and the third downlink radio measurement result measured by the first user device in a second cell, wherein the first cell is different from the second cell.

In an example, the step of determining a first radio measurement result of the first user device in a first type of network according to at least an obtained second radio measurement result of a second user device in the first type of network includes:

obtaining a second uplink radio measurement result by measuring, by the base station an uplink measurement signal sent by the second user device in the first type of network; and determining, by the base station a first uplink radio measurement result of the first user device in the first type of network according to at least the second uplink radio measurement result.

In an example, the step of determining a first radio measurement result of the first user device in a first type of network according to at least an obtained second radio measurement result of a second user device in the first type of network includes at least one of the following:

determining the second uplink radio measurement result as the first uplink radio measurement result of the first user device in the first type of network;

obtaining the first uplink radio measurement result of the first user device in the first type of network according to the second uplink radio measurement result and a second measurement offset; and obtaining the first uplink radio measurement result of the first user device in the first type of network according to the second uplink radio measurement result and a third uplink radio measurement result, measured by the base station of the first user device in the first type of network.

In an example, the step of obtaining the first uplink radio measurement result of the first user device in the first type of network according to the second uplink radio measurement result and a second measurement offset includes:
obtaining the first uplink radio measurement result of the first user device in the first type of network by compensating the second uplink radio measurement result with second measurement offset.

In an example, the method further includes:
obtaining, by the base station, the second measurement offset pre-written, pre-negotiated, or specified in a protocol.

In an example, the method further includes:
determining, by the base station the second measurement offset based on a difference between transmission power of the first user device and transmission power of the second user device.

In an example, the step of obtaining the first uplink radio measurement result of the first user device in the first type of network according to the second uplink radio measurement result and a second measurement offset includes:
determining an average of M second uplink radio measurement results, obtained by measuring in M measurement periods respectively, as the first uplink radio measurement result of the first user device in the first type of network in a time interval occupied by the M measurement periods.

In an example, the method further includes:
obtaining, by the base station, the M pre-written, pre-negotiated, or specified in a protocol.

In an example, the step of obtaining the first uplink radio measurement result of the first user device in the first type of network according to the second uplink radio measurement result and a third uplink radio measurement result, measured by the base station of the first user device in the first type of network includes at least one of the following:
obtaining the first uplink radio measurement result according to the second uplink radio measurement result measured in a third frequency range and the third uplink radio measurement result measured in a fourth frequency range, wherein the third frequency range is different from the fourth frequency range;
obtaining the first uplink radio measurement result according to the second uplink radio measurement result measured in a third time interval and the third uplink radio measurement result measured in a fourth time interval, wherein the third time interval is different from the fourth time interval; and
obtaining the first uplink radio measurement result according to the second uplink radio measurement result measured in a third cell and the third uplink radio measurement result measured in a fourth cell, wherein the third cell is being different from the fourth cell.

In an example, the method further includes:
performing, by the first user device in response to a condition that the device state of the first user device does not satisfy the measurement relaxation condition, a downlink radio measurement in the first type of network.

In an example, the step of determining a first downlink radio measurement result of the first user device in the first type of network according to at least an obtained second downlink radio measurement result of the second user device in the first type of network includes:
determining a first downlink radio measurement result of the first user device, for a channel state indication (CSI) signal according to at least an obtained second downlink radio measurement result for the CSI signal of the first type of network.

In an example, the first downlink radio measurement result of the first user device in the first type of network includes:
a first downlink radio measurement result of the first user device in a predetermined cell of the first type of network and/or a first downlink radio measurement result of the first user device in a predetermined beam of the first type of network.

In an example, the obtained second downlink radio measurement result of the second user device in a first type of network includes:
the second downlink radio measurement result of the second user device in the first type of network obtained through a second type of network.

In an example, the second user device being a device bundled to the first user device through a second type of network.

In an example, the measurement relaxation condition includes at least one of the following:
the first user device being a device bundled to the second user device through a second type of network;
a signal strength of the second type of network measured by the first user device is greater than a first signal strength threshold;
a distance between the first user device and the second user device is smaller than a first distance threshold;
a signal strength of the first type of network measured by the first user device is greater than a second signal strength threshold; and
a variation value of a signal strength, measured by the first user device within a predetermined time interval, of the first type of network is smaller than a variation threshold.

In an example, the method further includes:
transmitting, by the first user device, bundling information to the base station, where the bundling information is used for indicating that the first user device is bundled to the second user device through the second type of network.

In an example, the bundling information transmitted by the first user device contains identification information of the second user device.

In an example, the method further includes:
receiving, by the first user device, information of the measurement relaxation condition sent by the base station;
and/or,
obtaining, by the first user device or the base station, information of the measurement relaxation condition pre-negotiated or specified in a protocol.

In an example, the method further includes:
receiving, by the first user device, uplink measurement signal transmission configuration sent by the base station; and
transmitting, by the first user device an uplink measurement signal to the base station in a frequency domain, and/or a time domain, and/or a cell indicated by the uplink measurement signal transmission configuration.

In an example, the uplink measurement signal includes a sounding reference signal (SRS).

According to a second aspect of an embodiment of the present disclosure, a signal measurement method is provided, and applied to a second user device, including:
   transmitting, in response to that a device state of a first user device satisfies a measurement relaxation condition, a second radio measurement result of the second user device in a first type of network to the first user device;
   the transmitted second radio measurement result being used by the first user device in a measurement relaxation mode, to determine a first radio measurement result of the first user device in the first type of network.

In an example, the step of transmitting a second radio measurement result of the second user device in a first type of network to the first user device includes:
   transmitting a second downlink radio measurement result of the second user device in a first type of network to the first user device; and
   the transmitted second radio measurement result being used by the first user device in a measurement relaxation mode, to determine a first radio measurement result of the first user device in the first type of network includes:
   the transmitted second downlink radio measurement result being used by the first user device, to determine a first downlink radio measurement result of the first user device in the first type of network.

In an example, the transmitted second downlink radio measurement result in the first type of network includes:
   a transmitted second downlink radio measurement result of the first type of network for a channel state indication (CSI) signal; and
   the first downlink radio measurement result of the first user device in the first type of network comprises: a first downlink radio measurement result of the first user device for the CSI signal of the first type of network.

In an example, the second user device being a device bundled to the first user device through a second type of network.

In an example, the step of transmitting a second radio measurement result of the second user device in a first type of network includes:
   transmitting the second radio measurement result of the second user device in a first type of network through the second type of network.

In an example, the in response to a condition that a device state of a first user device satisfies a measurement relaxation condition includes:
   in response to conditions that the first user device is bundled to the second user device through the second type of network, and the device state of the first user device satisfies the measurement relaxation condition.

In an example, the method further includes:
   transmitting bundling information to a base station, where the bundling information is used for indicating that the first user device is bundled to the second user device through the second type of network.

In an example, the bundling information transmitted by the second user device contains identification information of the first user device.

In an example, the method further includes:
   receiving uplink measurement signal transmission configuration sent by the base station; and
   transmitting an uplink measurement signal to the base station in a frequency domain, and/or a time domain, and/or a cell indicated by the uplink measurement signal transmission configuration.

In an example, the uplink measurement signal includes a sounding reference signal (SRS).

According to a third aspect of an embodiment of the present disclosure, a signal measurement apparatus is provided, including: a first determination module and a first measurement module, where
   the first determination module is configured for determining a device state of a first user device; and
   the first measurement module is configured for entering, in response to that the device state of the first user device satisfies a measurement relaxation condition, a measurement relaxation mode, and in the measurement relaxation mode, determining a first radio measurement result of the first user device in a first type of network according to at least an obtained second radio measurement result of a second user device in the first type of network.

In an example, the first measurement module includes:
   a downlink measurement module configured for determining a first downlink radio measurement result of the first user device in the first type of network according to at least an obtained second downlink radio measurement result of the second user device in a first type of network.

In an example, the downlink measurement module includes at least one of the following:
   a first downlink measurement sub-module configured for determining the obtained second downlink radio measurement result as the first downlink radio measurement result of the first user device in the first type of network;
   a second downlink measurement sub-module configured for obtaining the first downlink radio measurement result of the first user device in the first type of network according to the obtained second downlink radio measurement result and a first measurement offset; and
   a third downlink measurement sub-module configured for obtaining the first downlink radio measurement result of the first user device in the first type of network according to the obtained second downlink radio measurement result and a third downlink radio measurement result of the first user device in the first type of network.

In an example, the second downlink measurement sub-module includes:
   a first downlink measurement unit configured for obtaining the first downlink radio measurement result of the first user device in the first type of network by compensating the obtained second downlink radio measurement result with first measurement offset.

In an example, the signal measurement apparatus further includes:
   a first reception module configured for receiving the first measurement offset sent by a base station; or
   a first obtaining module configured for obtaining the first measurement offset pre-written, pre-negotiated, or specified in a protocol.

In an example, the signal measurement apparatus further includes:
   a second determination module configured for determining, by the first user device the first measurement offset based on a gain difference between a radio power amplifier of the first user device and a radio power amplifier of the second user device.

In an example, the second downlink measurement sub-module includes:
  a second downlink measurement unit configured for determining an average of obtained N second downlink radio measurement results, obtained by measuring by the second user device in N measurement periods respectively, as the first downlink radio measurement result, in a time interval occupied by the N measurement periods of the first user device in the first type of network.

In an example, the signal measurement apparatus further includes:
  a second reception module configured for receiving the N sent by the base station;
  or,
  a second obtaining module configured for obtaining the N pre-written, pre-negotiated, or specified in a protocol.

In an example, the third downlink measurement sub-module includes at least one of the following:
  a third downlink measurement unit configured for obtaining the first downlink radio measurement result according to the obtained second downlink radio measurement result measured by the second user device in a first frequency range and the third downlink radio measurement result measured by the first user device in a second frequency range, wherein the first frequency range is different from the second frequency range;
  a fourth downlink measurement unit configured for obtaining the first downlink radio measurement result according to the obtained second downlink radio measurement result measured by the second user device in a first time interval and the third downlink radio measurement result measured by the first user device in a second time interval, wherein the first time interval is different from the second time interval; and
  a fifth downlink measurement unit configured for obtaining the first downlink radio measurement result according to the obtained second downlink radio measurement result measured by the second user device in a first cell and the third downlink radio measurement result measured by the first user device in a second cell, wherein the first cell is different from the second cell.

In an example, the first measurement module includes:
  an uplink measurement module configured for obtaining a second uplink radio measurement result by measuring an uplink measurement signal sent by the second user device in the first type of network, and determining a first uplink radio measurement result of the first user device in the first type of network according to at least the second uplink radio measurement result.

In an example, the uplink measurement module includes at least one of the following:
  a first uplink measurement sub-module configured for determining the second uplink radio measurement result as the first uplink radio measurement result of the first user device in the first type of network;
  a second uplink measurement sub-module configured for obtaining the first uplink radio measurement result of the first user device in the first type of network according to the second uplink radio measurement result and a second measurement offset; and
  a third uplink measurement sub-module configured for obtaining the first uplink radio measurement result of the first user device in the first type of network according to the second uplink radio measurement result and a third uplink radio measurement result, measured by the base station of the first user device in the first type of network.

In an example, the second uplink measurement sub-module includes:
  a first uplink measurement unit configured for obtaining the first uplink radio measurement result of the first user device in the first type of network by compensating the second uplink radio measurement result with second measurement offset.

In an example, the signal measurement apparatus further includes:
  a third obtaining module configured for obtaining the second measurement offset pre-written, pre-negotiated, or specified in a protocol.

In an example, the signal measurement apparatus further includes:
  a third determination module configured for determining, by the base station the second measurement offset based on a difference between transmission power of the first user device and transmission power of the second user device.

In an example, the second uplink measurement sub-module includes:
  a second uplink measurement unit configured for determining an average of M second uplink radio measurement results, obtained by measuring in M measurement periods respectively, as the first uplink radio measurement result of the first user device in the first type of network in a time interval occupied by the M measurement periods.

In an example, the signal measurement apparatus further includes:
  a fourth determination module configured for obtaining the M pre-written, pre-negotiated, or specified in a protocol.

In an example, the third uplink measurement sub-module includes at least one of the following:
  a third uplink measurement unit configured for obtaining the first uplink radio measurement result according to the second uplink radio measurement result measured in a third frequency range and the third uplink radio measurement result measured in a fourth frequency range, wherein the third frequency range is different from the fourth frequency range;
  a fourth uplink measurement unit configured for obtaining the first uplink radio measurement result according to the second uplink radio measurement result measured in a third time interval and the third uplink radio measurement result measured in a fourth time interval, wherein the third time interval is different from the fourth time interval; and
  a fifth uplink measurement unit configured for obtaining the first uplink radio measurement result according to the second uplink radio measurement result measured in a third cell and the third uplink radio measurement result measured in a fourth cell, wherein the third cell is being different from the fourth cell.

In an example, the signal measurement apparatus further includes:
  a second measurement module configured for performing, by the first user device in response to a condition that the device state of the first user device does not satisfy the measurement relaxation condition, a downlink radio measurement in the first type of network.

In an example, the downlink measurement module includes:
a fourth downlink measurement sub-module configured for determining a first downlink radio measurement result of the first user device, for a channel state indication (CSI) signal according to at least an obtained second downlink radio measurement result for the CSI signal of the first type of network.

In an example, the first downlink radio measurement result of the first user device in the first type of network includes:
a first downlink radio measurement result of the first user device in a predetermined cell of the first type of network and/or a first downlink radio measurement result of the first user device in a predetermined beam of the first type of network.

In an example, the obtained second downlink radio measurement result of the second user device in a first type of network includes:
the second downlink radio measurement result, obtained through a second type of network in the first type of network, of the second user device.

In an example, the second user device being a device bundled to the first user device through a second type of network.

In an example, the measurement relaxation condition includes at least one of the following:
the first user device being a device bundled to the second user device through a second type of network;
a signal strength of the second type of network measured by the first user device is greater than a first signal strength threshold;
a distance between the first user device and the second user device is smaller than a first distance threshold;
a signal strength of the first type of network measured by the first user device is greater than a second signal strength threshold; and
a variation value of a signal strength, measured by the first user device within a predetermined time interval, of the first type of network is smaller than a variation threshold.

In an example, the signal measurement apparatus further includes:
a first transmission module configured for transmitting, by the first user device, bundling information to a base station, wherein the bundling information is used for indicating that the first user device is bundled to the second user device through a second type of network.

In an example, the bundling information transmitted by the first user device contains identification information of the second user device.

In an example, the signal measurement apparatus further includes:
a second transmission module configured for receiving, by the first user device, information of the measurement relaxation condition sent by the base station;
and/or,
a fourth obtaining module configured for obtaining, by the first user device or the base station, information of the measurement relaxation condition pre-negotiated or specified in a protocol.

In an example, the signal measurement apparatus further includes:
a third reception module configured for receiving, by the first user device, uplink measurement signal transmission configuration sent by the base station; and a third transmission module configured for transmitting, by the first user device an uplink measurement signal to the base station in a frequency domain, and/or a time domain, and/or a cell indicated by the uplink measurement signal transmission configuration.

In an example, the uplink measurement signal includes a sounding reference signal (SRS).

According to a fourth aspect of an embodiment of the present disclosure, a signal measurement apparatus is provided, and applied to a second user device, including: a fourth transmission module, where
the fourth transmission module is configured for transmitting, in response to that a device state of a first user device satisfies a measurement relaxation condition, a second radio measurement result of the second user device in a first type of network to the first user device;
the transmitted second radio measurement result being used by the first user device in a measurement relaxation mode, to determine a first radio measurement result of the first user device in the first type of network.

In an example, the fourth transmission module includes:
a first transmission sub-module configured for transmitting a second downlink radio measurement result of the second user device in a first type of network to the first user device; and
the transmitted second radio measurement result being used by the first user device in a measurement relaxation mode, to determine a first radio measurement result of the first user device in the first type of network comprises:
the transmitted second downlink radio measurement result being used by the first user device, to determine a first downlink radio measurement result of the first user device in the first type of network.

In an example, the transmitted second downlink radio measurement result in the first type of network includes:
a transmitted second downlink radio measurement result of the first type of network for a channel state indication (CSI) signal; and
the first downlink radio measurement result of the first user device in the first type of network comprises: a first downlink radio measurement result of the first user device for the CSI signal of the first type of network.

In an example, the second user device being a device bundled to the first user device through a second type of network.

In an example, the fourth transmission module includes:
a second transmission sub-module configured for transmitting the second radio measurement result of the second user device in a first type of network through the second type of network.

In an example, the fourth transmission module includes:
a third transmission sub-module configured for responding to conditions that the first user device is bundled to the second user device through the second type of network, and the device state of the first user device satisfies the measurement relaxation condition.

In an example, the signal measurement apparatus further includes:
a fifth transmission module configured for transmitting bundling information to a base station, where the bundling information is used for indicating that the first user device is bundled to the second user device through the second type of network.

In an example, the bundling information transmitted by the second user device contains identification information of the first user device.

In an example, the signal measurement apparatus further includes:
  a fourth reception module configured for receiving uplink measurement signal transmission configuration sent by the base station; and
  a sixth transmission module configured for transmitting an uplink measurement signal to the base station in a frequency domain, and/or a time domain, and/or a cell indicated by the uplink measurement signal transmission configuration.

In an example, the uplink measurement signal includes a sounding reference signal (SRS).

According to a fifth aspect of an embodiment of the present disclosure, a communication device is provided, including: a processor, a transceiver, a memory, and an executable program which is stored on the memory and runnable by the processor, where when running the executable program, the processor executes steps of the signal measurement method according to the first or second aspect.

According to a sixth aspect of an embodiment of the present disclosure, a non-transitory storage medium is provided, storing an executable program, where the executable program implements steps of the signal measurement method according to the first or second aspect when executed by a processor.

The examples of the disclosure provide the signal measurement method and apparatus, the communication device and the storage medium. The method includes: determining the device state of the first user device; entering, in response to that the device state of the first user device satisfies a measurement relaxation condition, a measurement relaxation mode, and in the measurement relaxation mode, determining a first radio measurement result of the first user device in a first type of network according to at least an obtained second radio measurement result of a second user device in the first type of network. In this way, the second user device measures radio signals and determines a first measurement result of the first user device according to the radio measurement result. The first user device does not perform or reduces the radio signal measurement, so that power consumed by the first user device for the radio signal measurement may be reduced, to prolong a standby time of the first user device.

Other implementation of the examples of the disclosure will be easily conceived by those skilled in the art in consideration of the description and practice of the inventions disclosed herein. The disclosure is intended to cover any variations, uses or adaptive changes of the examples of the disclosure, which follow the general principles of the examples of the disclosure and include common general knowledge or conventional technical means, which is not disclosed in the examples of the disclosure, in the art. The description and the examples are to be regarded as illustrative only, and the true scope and spirit of the examples of the disclosure are indicated by the following claims.

It is to be understood that the examples of the disclosure are not limited to precise structures which have been described above and shown in the accompanying drawings, and may have various modifications and changes without departing from the its scope. The scope of the examples of the disclosure is limited by the appended claims only.

What is claimed is:

1. A method for signal measurement, comprising:
  entering, in a case where a first user device satisfies a measurement relaxation condition, a measurement relaxation mode;
  in the measurement relaxation mode, determining a first radio measurement result of the first user device in a first type of network according to at least an obtained second radio measurement result of a second user device in the first type of network, wherein the first radio measurement result and the second radio measurement result comprise at least one of an uplink radio measurement result of an uplink signal or a downlink radio measurement result of a downlink signal;
  wherein the determining the first radio measurement result of the first user device in the first type of network according to at least the obtained second radio measurement result of the second user device in the first type of network comprises:
  obtaining a second uplink radio measurement result by measuring an uplink measurement signal sent by the second user device in the first type of network; and
  determining, a first uplink radio measurement result of the first user device in the first type of network according to at least the second uplink radio measurement result;
  wherein the determining the first uplink radio measurement result of the first user device in the first type of network according to at least the second uplink radio measurement result comprises:
  obtaining the first uplink radio measurement result of the first user device in the first type of network by compensating the second uplink radio measurement result with a second measurement offset, wherein the second measurement offset is determined based on a difference between transmission power of the first user device and transmission power of the second user device;
  wherein the measurement relaxation condition comprises at least one of:
  the first user device being a device bundled to the second user device through a second type of network;
  a signal strength of the second type of network measured by the first user device is greater than a first signal strength threshold;
  a distance between the first user device and the second user device is smaller than a first distance threshold;
  a signal strength of the first type of network measured by the first user device is greater than a second signal strength threshold;
  a variation value of a signal strength, measured by the first user device within a predetermined time interval, of the first type of network is smaller than a variation threshold;
  the first user device is in a center of a serving cell; or,
  the first user device is in a low movement state;
  wherein the measurement relaxation mode comprises at least one of:
  a measurement mode wherein the first user device does not perform a radio measurement in the first type of network in a downlink radio measurement;
  a measurement mode wherein the first user device reduces a radio measurement frequency relative to a non-measurement relaxation mode in the downlink radio measurement;
  a measurement mode wherein a base station does not perform an uplink radio measurement on the first user device in the uplink radio measurement; or,
  a measurement mode wherein the base station reduces, relative to the non-measurement relaxation mode, a measurement frequency on an uplink measurement signal of the first user device in the uplink radio measurement;

wherein the non-measurement relaxation mode is one other than the measurement relaxation mode.

2. The method according to claim 1, wherein the determining the first radio measurement result of the first user device in the first type of network according to at least the obtained second radio measurement result of the second user device in the first type of network comprises:
   determining, by the first user device, a first downlink radio measurement result of the first user device in the first type of network according to at least an obtained second downlink radio measurement result of the second user device in the first type of network.

3. The method according to claim 2, wherein the determining the first radio measurement result of the first user device in the first type of network according to at least the obtained second radio measurement result of the second user device in the first type of network comprises at least one of:
   determining the obtained second downlink radio measurement result as the first downlink radio measurement result of the first user device in the first type of network;
   obtaining the first downlink radio measurement result of the first user device in the first type of network according to the obtained second downlink radio measurement result and a first measurement offset; and
   obtaining the first downlink radio measurement result of the first user device in the first type of network according to the obtained second downlink radio measurement result and a third downlink radio measurement result of the first user device in the first type of network.

4. The method according to claim 3, wherein the obtaining the first downlink radio measurement result of the first user device in the first type of network according to the obtained second downlink radio measurement result and a first measurement offset comprises:
   obtaining the first downlink radio measurement result of the first user device in the first type of network by compensating the obtained second downlink radio measurement result with a first measurement offset.

5. The method according to claim 4, further comprising:
   receiving, by the first user device, the first measurement offset sent by a base station;
   or,
   obtaining, by the first user device, the first measurement offset pre-written, pre-negotiated, or specified in a protocol;
   or,
   determining, by the first user device the first measurement offset based on a gain difference between a radio power amplifier of the first user device and a radio power amplifier of the second user device.

6. The method according to claim 3, wherein the obtaining the first downlink radio measurement result of the first user device in the first type of network according to the obtained second downlink radio measurement result and a first measurement offset comprises:
   determining an average of obtained N second downlink radio measurement results, obtained by measuring by the second user device in N measurement periods respectively, as the first downlink radio measurement result, in a time interval occupied by the N measurement periods of the first user device in the first type of network,
   further comprising:
   receiving, by the first user device, the N sent by a base station;
   or,
   obtaining, by the first user device, the N pre-written, pre-negotiated, or specified in a protocol.

7. The method according to claim 3, wherein the obtaining the first downlink radio measurement result of the first user device in the first type of network according to the obtained second downlink radio measurement result and the third downlink radio measurement result of the first user device in the first type of network comprises at least one of:
   obtaining the first downlink radio measurement result according to the obtained second downlink radio measurement result measured by the second user device in a first frequency range and the third downlink radio measurement result measured by the first user device in a second frequency range, wherein the first frequency range is different from the second frequency range;
   obtaining the first downlink radio measurement result according to the obtained second downlink radio measurement result measured by the second user device in a first time interval and the third downlink radio measurement result measured by the first user device in a second time interval, wherein the first time interval is different from the second time interval; and
   obtaining the first downlink radio measurement result according to the obtained second downlink radio measurement result measured by the second user device in a first cell and the third downlink radio measurement result measured by the first user device in a second cell, wherein the first cell is different from the second cell.

8. The method according to claim 1, wherein the determining the first uplink radio measurement result of the first user device in the first type of network according to at least the second uplink radio measurement result further comprises at least one of:
   determining the second uplink radio measurement result as the first uplink radio measurement result of the first user device in the first type of network;
   obtaining the first uplink radio measurement result of the first user device in the first type of network according to the second uplink radio measurement result and a third uplink radio measurement result of the first user device in the first type of network.

9. The method according to claim 1, wherein the determining the first uplink radio measurement result of the first user device in the first type of network according to at least the second uplink radio measurement result comprises:
   determining an average of M second uplink radio measurement results, obtained by measuring in M measurement periods respectively, as the first uplink radio measurement result of the first user device in the first type of network in a time interval occupied by the M measurement periods.

10. The method according to claim 8, wherein the obtaining the first uplink radio measurement result of the first user device in the first type of network according to the second uplink radio measurement result and the third uplink radio measurement result of the first user device in the first type of network comprises at least one of:
   obtaining the first uplink radio measurement result according to the second uplink radio measurement result measured in a third frequency range and the third uplink radio measurement result measured in a fourth frequency range, wherein the third frequency range is different from the fourth frequency range;
   obtaining the first uplink radio measurement result according to the second uplink radio measurement result measured in a third time interval and the third uplink radio measurement result measured in a fourth time interval, wherein the third time interval is different from the fourth time interval; and obtaining the first uplink radio measurement result according to the second uplink radio measurement result measured in a third cell and the third uplink radio measurement result measured in a fourth cell, wherein the third cell is being different from the fourth cell.

11. The method according to claim 2, further comprising:

performing, by the first user device in response to a condition that a respective device state of the first user device does not satisfy the measurement relaxation condition, a downlink radio measurement in the first type of network.

12. The method according to claim 1, wherein the second user device being a device bundled to the first user device through a second type of network.

13. A method for signal measurement, performed by a second user device, the method comprising:

transmitting a second radio measurement result of a second user device in a first type of network to a first user device;

the transmitted second radio measurement result being used by the first user device in a measurement relaxation mode, to determine a first radio measurement result of the first user device in the first type of network, wherein the first radio measurement result and the second radio measurement result comprise at least one of an uplink radio measurement result of an uplink signal or a downlink radio measurement result of a downlink signal, wherein the first user device enters the measurement relaxation mode in a case where a measurement relaxation condition is satisfied;

wherein the determine the first radio measurement result of the first user device in the first type of network comprises:

obtaining a second uplink radio measurement result by measuring an uplink measurement signal sent by the second user device in the first type of network; and determining, a first uplink radio measurement result of the first user device in the first type of network according to at least the second uplink radio measurement result;

wherein the determining the first uplink radio measurement result of the first user device in the first type of network according to at least the second uplink radio measurement result comprises:

obtaining the first uplink radio measurement result of the first user device in the first type of network by compensating the second uplink radio measurement result with a second measurement offset, wherein the second measurement offset is determined based on a difference between transmission power of the first user device and transmission power of the second user device;

wherein the measurement relaxation condition comprises at least one of:

the first user device being a device bundled to the second user device through a second type of network;

a signal strength of the second type of network measured by the first user device is greater than a first signal strength threshold;

a distance between the first user device and the second user device is smaller than a first distance threshold;

a signal strength of the first type of network measured by the first user device is greater than a second signal strength threshold;

a variation value of a signal strength, measured by the first user device within a predetermined time interval, of the first type of network is smaller than a variation threshold;

the first user device is in a center of a serving cell; or, the first user device is in a low movement state;

wherein the measurement relaxation mode comprises at least one of:

a measurement mode wherein the first user device does not perform a radio measurement in the first type of network in a downlink radio measurement;

a measurement mode wherein the first user device reduces a radio measurement frequency relative to a non-measurement relaxation mode in the downlink radio measurement;

a measurement mode wherein a base station does not perform an uplink radio measurement on the first user device in the uplink radio measurement; or, a measurement mode wherein the base station reduces, relative to the non-measurement relaxation mode, a measurement frequency on an uplink measurement signal of the first user device in the uplink radio measurement;

wherein the non-measurement relaxation mode is one other than the measurement relaxation mode.

14. The method according to claim 13, wherein the transmitting the second radio measurement result of the second user device in the first type of network to the first user device comprises:

transmitting a second downlink radio measurement result of the second user device in the first type of network to the first user device; and the transmitted second radio measurement result being used by the first user device in the measurement relaxation mode, to determine the first radio measurement result of the first user device in the first type of network comprises:

the transmitted second downlink radio measurement result being used by the first user device, to determine a first downlink radio measurement result of the first user device in the first type of network.

15. The method according to claim 14, wherein the transmitted second downlink radio measurement result in the first type of network comprises:

a transmitted second downlink radio measurement result of the first type of network for a channel state indication (CSI) signal; and the first downlink radio measurement result of the first user device in the first type of network comprises:

the first downlink radio measurement result of the first user device for the CSI signal of the first type of network.

* * * * *